United States Patent
Maekawa et al.

(10) Patent No.: US 7,440,125 B2
(45) Date of Patent: Oct. 21, 2008

(54) SETTING INFORMATION TRANSMISSION/RECEPTION SYSTEM

(75) Inventors: Yohei Maekawa, Nagoya (JP); Kiyotaka Ohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 987 days.

(21) Appl. No.: 10/461,355

(22) Filed: Jun. 16, 2003

(65) Prior Publication Data

US 2004/0201866 A1 Oct. 14, 2004

(30) Foreign Application Priority Data

Jun. 14, 2002 (JP) ............................ P2002-173999

(51) Int. Cl.
*G06F 3/12* (2006.01)
(52) U.S. Cl. ..................................... 358/1.15; 710/106
(58) Field of Classification Search ........... 358/1.1–1.9, 358/1.11–1.18; 710/706
See application file for complete search history.

(56) References Cited

U.S. PATENT DOCUMENTS 7,167,260 B2  1/2007  Iwata et al.

2002/0163666 A1 * 11/2002 Iwata et al. ................ 358/1.15

FOREIGN PATENT DOCUMENTS

| JP | A 05-336144 | 12/1993 |
|---|---|---|
| JP | A 5-336144 | 12/1993 |
| JP | A 09-101932 | 4/1997 |
| JP | A 9-101932 | 4/1997 |
| JP | A 10-155010 | 6/1998 |
| JP | 2001024635 A * | 1/2001 |
| JP | A 2001-24635 | 1/2001 |
| JP | A 2001-043038 | 2/2001 |
| JP | A 2001-43038 | 2/2001 |
| JP | WO0177809 A1 * | 4/2001 |
| WO | WO 01/77809 | 10/2001 |

* cited by examiner

*Primary Examiner*—King Poon
*Assistant Examiner*—Lennin R Rodriguez
(74) *Attorney, Agent, or Firm*—Oliff & Berridge, PLC

(57) ABSTRACT

When a setting relating to the print quality of a printer 3 is changed (T601), sending of ssdp:byebye to PCs 2 (T603) and time measurement by a timer 37 (T605) are executed. Then, after the elapse of 30seconds from the start of time measurement by the timer 37, ssdp:alive is sent to the PCs 2 (T615). Even if a paper size related setting change (T607) or multiple page printing (condensed printing) setting change (T609) is made during this 30-second interval, ssdp:alive is not sent to the PCs 2 for those changes executed during the 30-second interval.

11 Claims, 20 Drawing Sheets

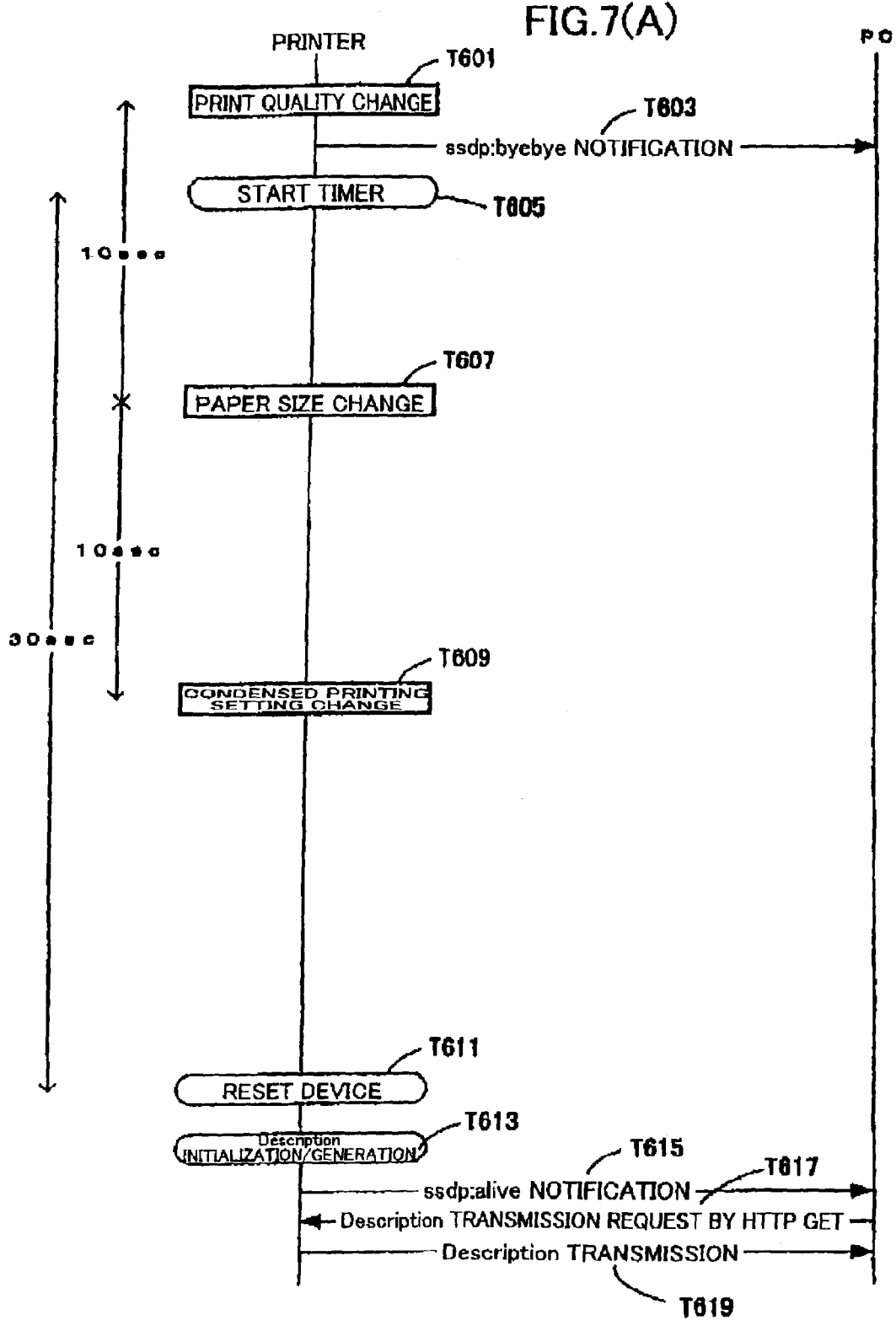

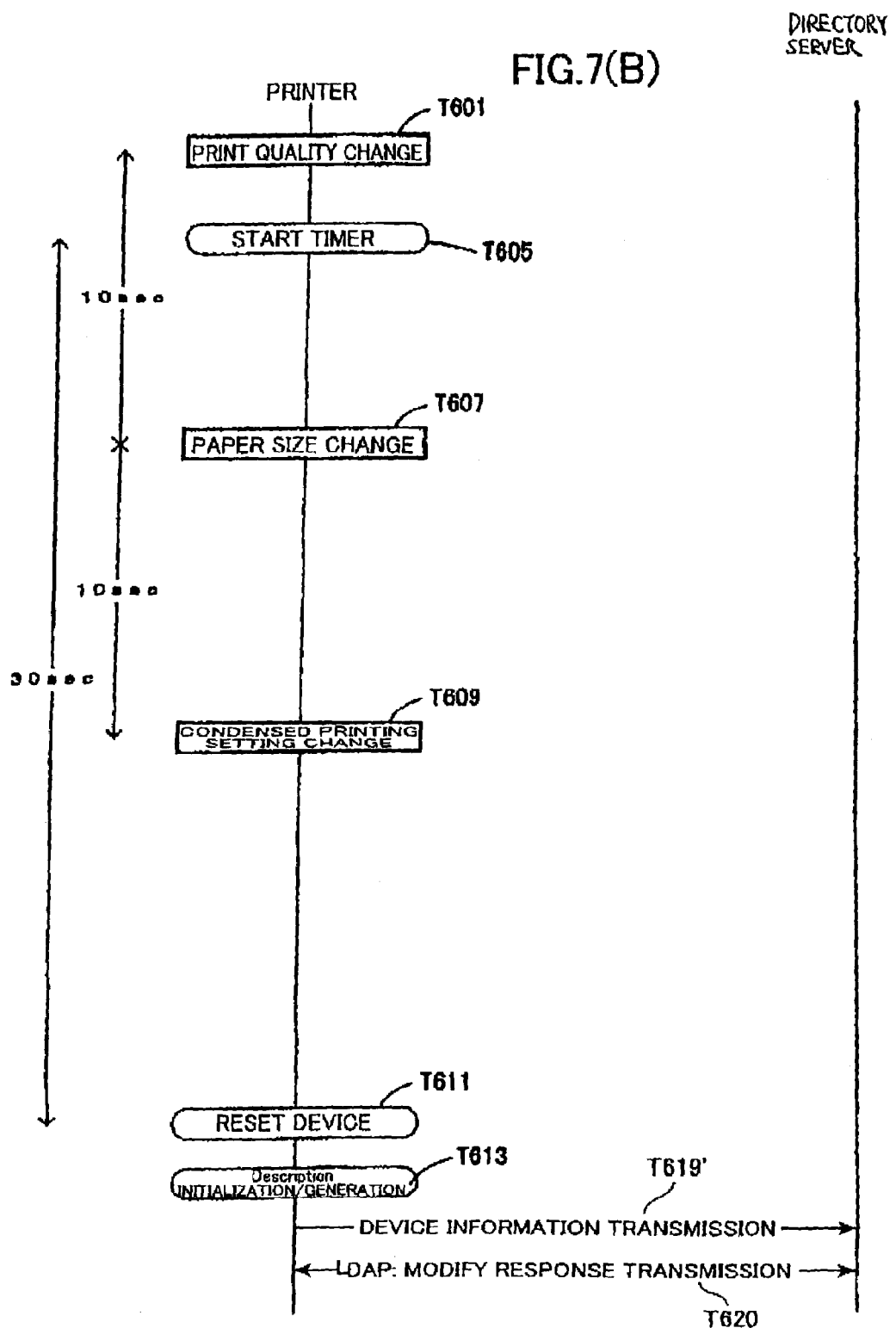

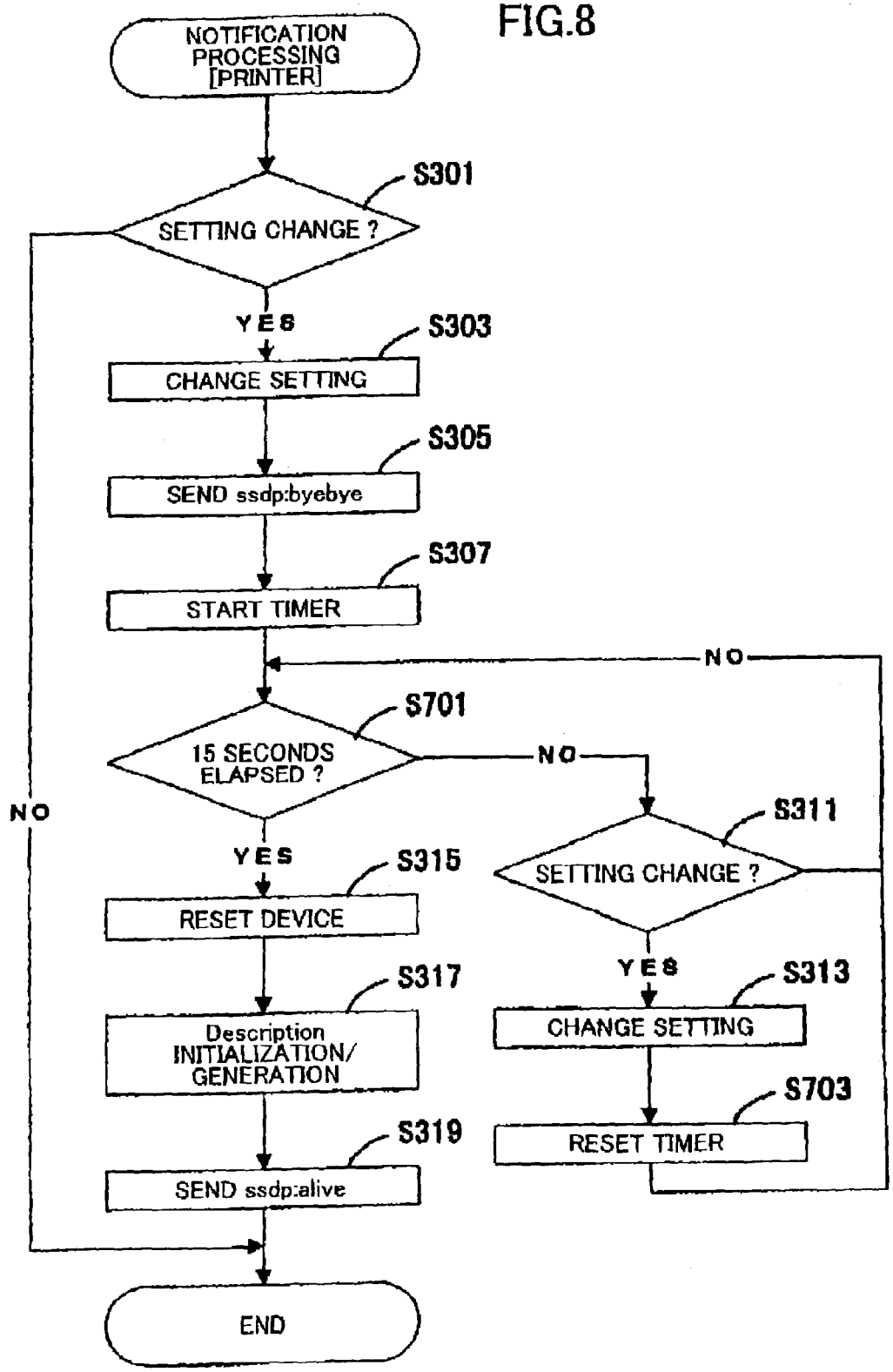

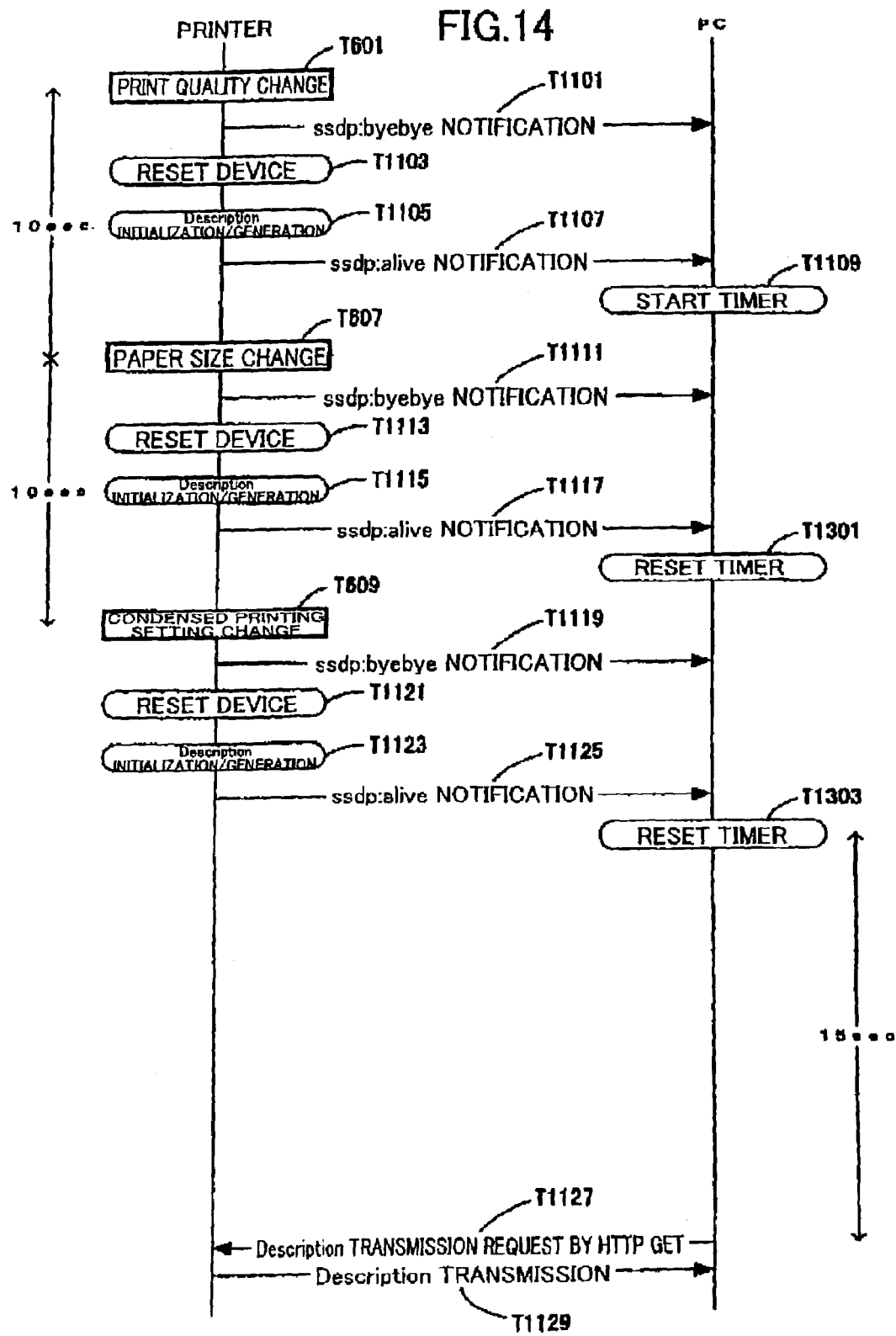

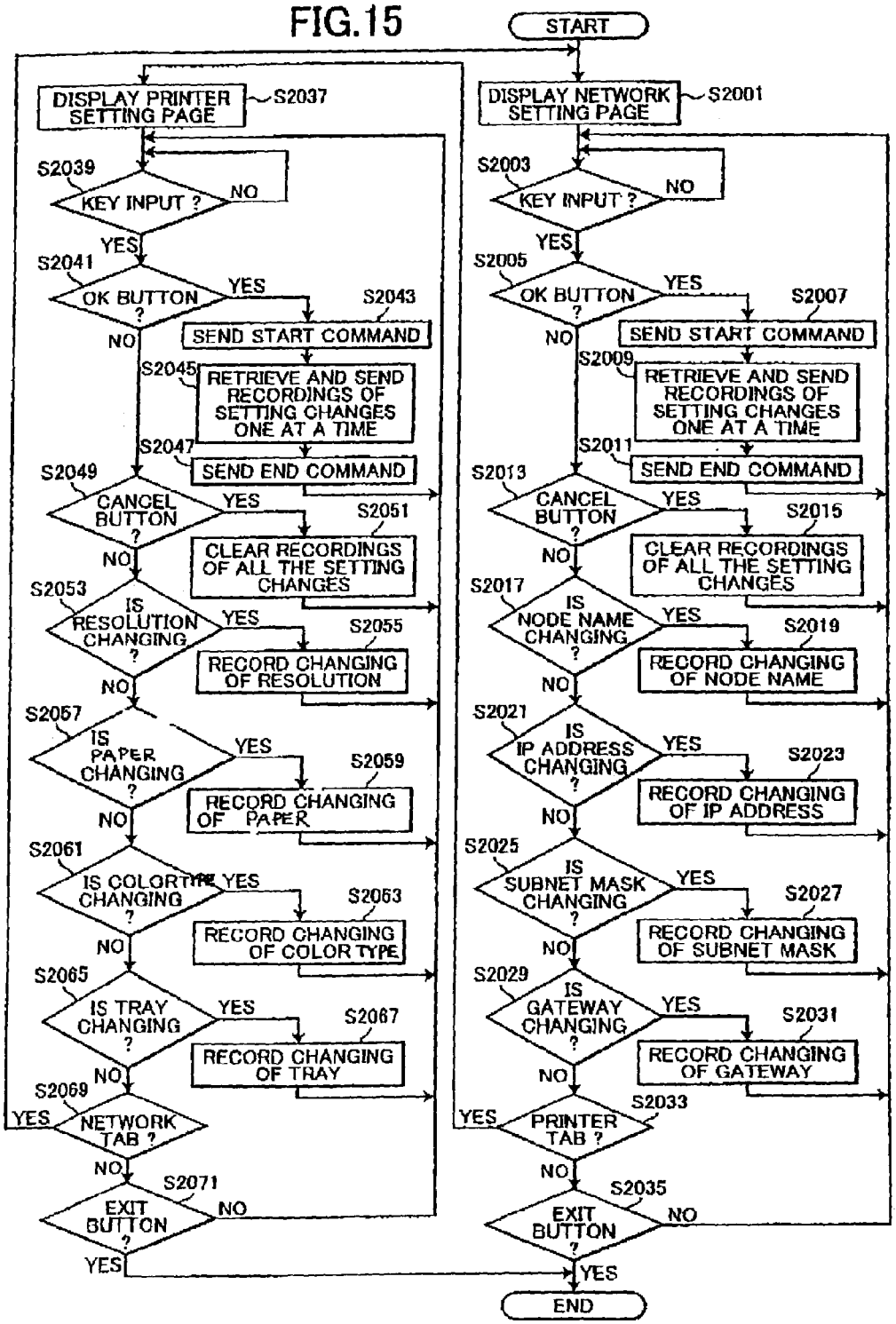

FIG.16(A)

Network | Printer

| | |
|---|---|
| Node Name | BRN-123456 |
| IP Address | 10. 151. 12. 34 |
| Subnet Mask | 255. 255. 0. 0 |
| Gateway | 10. 151. 254. 254 |

[OK] [Cancel] [Exit]

FIG.16(B)

Network | Printer

| | |
|---|---|
| Resolution | 600 dpi ▼ |
| Paper | Letter ▼ |
| Color/Mono | mono ▼ |
| Tray | Tray 1 ▼ |

[OK] [Cancel] [Exit]

SETTING INFORMATION TRANSMISSION/RECEPTION SYSTEM

BACKGROUND OF THE INVENTION

1. Field of the Invention

The present invention relates to a setting information transmission/reception system that transmits information of settings of a transmitter to a receiver, and to the transmitter and the receiver.

2. Description of Related Art

In recent years a mode has become widely used in which a plurality of network terminal devices are connected to a network, and network terminal devices are used in a mutually cooperative fashion. When a plurality of network terminal devices are connected to a network and used cooperatively in this way, it is necessary for setting information relating to one cooperatively-used network terminal device to be transmitted to another network terminal device, and for that other network terminal device to recognize settings relating to that first network terminal device. The reason for this is that, if settings relating to one network terminal device are not recognized by another network terminal device, a setting discrepancy will occur between the two, causing a problem when they are used cooperatively.

The conventional procedure for having setting information relating to one network terminal device recognized by another network terminal device will now be described. The following description takes the example of a network that uses Universal Plug and Play (UPnP), which is one kind of network technology. Special features of UPnP are that a network terminal device can join or leave a network while that network terminal device's power is on (a facility known as "hot-plug"), and that special driver software is not necessary and UPnP is not dependent on the kind of OS (operating system) started up on network terminal devices. UPnP is thus known as a technology that offers outstanding ease of connection to a network.

FIG. 1 shows a timing chart when printer setting information for a printer that is a UPnP device is transmitted from the printer to a personal computer (hereinafter referred to as "PC") in which a UPnP control point that manages and controls UPnP devices has been activated. Here, an example is described in which the user changes default settings relating to printer print quality (Print Quality), paper size (Media Size), and multiple page printing (Number Up: 2-in-1, 4-in-1, or similar facilities for printing a plurality of pages in condensed form on a single sheet of paper) consecutively at 10-second intervals.

First, when a default setting relating to printer print quality is changed by a user—for example, changing from low quality (such as 300 dpi) to medium quality (such as 600 dpi) (T1401)—the printer, which is a UPnP device, sends ssdp:byebye (ssdp=Simple Service Discovery Protocol) to a UPnP control point (here and hereinafter a PC) connected to the network (T1403). This ssdp:byebye informs the UPnP control point connected to the network that the printer has left the network. More specifically, because a change has been made in the printer settings, there is a discrepancy between the printer settings after the change and the pre-change printer settings recognized by the PC. Accordingly, the printer reports that the printer is temporarily leaving the network.

After performing a reset operation (T1405), the printer executes initialization and generation of Description (XML (Extensible Markup Language) data indicative of setting information, etc. of the subject printer) (T1407) in order to provide the PC with the Description in which the above-described change contents are reflected.

The printer then sends ssdp:alive to the PCs connected to the network (T1409). This ssdp:alive is to inform UPnP control point PCs that the printer has joined the network.

When a PC receives this ssdp:alive, the PC sends to the printer that has sent ssdp:alive an HTTP GET command requesting transmission of a Description indicative of information of the settings of that printer (T1411). In response to this, the printer transmits to the PC a Description showing information of the newly-changed setting (T1413). By receiving this Description, the PC can recognize the new printer setting (default print quality setting =medium quality).

It is noted that when a UPnP control point that receives ssdp:alive sends an HTTP GET command to a UPnP device, the UPnP device sends back a Device Description containing the device information of the UPnP device. Then, when the UPnP control point again sends an HTTP GET command based on a URL (Uniform Resource Locator) that is included in the Device Description, the UPnP device sends back a Service Description containing setting information of the UPnP device. Essentially, the UPnP control point can recognize the settings of the UPnP device (printer settings) only when the UPnP control point obtains this Service Description. However, for the sake of simplicity, acquisition of the Device Description and acquisition of Service Description will be regarded as a single operation (acquisition of the Description) in the following description.

The above-described exchange of data is executed each time a setting is changed. Therefore, the same processing (T1417 through T1427, T1431 through T1441) is also executed for a paper size-related default setting change (T1415) made 10 seconds after the print quality default setting is changed, and a multiple page-related default setting change (T1429) made 10 seconds after the paper size default setting is changed.

SUMMARY OF THE INVENTION

However, in the above-described conventional setting information transmission/reception system, since printer setting information (Description in FIG. 1) is transmitted to a PC (T1413, T1427, T1441) each time a printer setting is changed (T1401, T1415, T1429), a load proportional to the number of setting changes is imposed on the network.

It is an objective of the present invention to overcome the above-described problem by providing an improved setting information transmission/reception system, transmitter, and receiver that make it possible to reduce the load imposed on a network when one network terminal device is made to recognize setting change contents relating to another network terminal device in a network in which these network terminal devices are connected.

In order to attain the above and other objects, the present invention provides a transmitter connectable with a network, the transmitter comprising: a storage portion storing setting-information; an instruction receiving portion capable of receiving a setting-change instruction indicative of a setting-change; an instruction-group specifying portion specifying, as an instruction group, at least one successive setting-change instruction, which is received by the instruction receiving portion successively and which is indicative of at least one setting-change: a setting-information updating portion successively updating the setting information in the storage portion based on the at least one successive setting-change in the instruction group, to thereby obtain final setting-information;

and a transmission portion transmitting, via a network to a receiver, a set of final-setting-data indicative of the final setting-information after the final setting-information is obtained.

According to another aspect, the present invention provides a setting information transmission/reception system, comprising: a transmitter connectable with a network, the transmitter including: a storage portion storing setting-information; an instruction receiving portion capable of receiving a setting-change instruction indicative of a setting-change; an instruction-group specifying portion specifying, as an instruction group, at least one successive setting-change instruction, which is received by the instruction receiving portion successively and which is indicative of at least one setting-change; a setting-information updating portion successively updating the setting information in the storage portion based on the at least one successive setting-change in the instruction group, to thereby obtain final setting-information; and a transmission portion transmitting, via a network to a receiver, a set of final-setting-data indicative of the final setting-information after the final setting-information is obtained; and the receiver that is connected to the network and that receives the set of final-setting-data from the transmitter via the network.

According to another aspect, the present invention provides a setting information transmission/reception system, comprising: a transmitter that is connectable to a network and that transmits to a receiver via the network setting information specifying the transmitter's own settings, the transmitter including: a changing portion changing a setting of the transmitter; an out-of-period determining portion determining whether or not a setting has been changed by said changing portion; a time measurement portion starting time measurement when the out-of-period determining portion determines that a setting has been changed; a within-period determining portion determining whether or not a further setting change has been performed by said changing portion within a predetermined period from the start of the time measurement; an updating portion updating setting information when the within-period determining portion determines that a further setting change has been performed; and a transmitting portion transmitting the setting information to the receiver when it is determined that the predetermined period has elapsed based on the time measurement by the time measurement portion; and the receiver that is connected to the network and that receives the setting information transmitted from the transmitter, the receiver including a receiving portion receiving the setting information transmitted from the transmitting portion.

According to another aspect, the present invention provides a transmitter connectable to a network for transmitting to a receiver via the network setting information specifying the transmitter's own settings, the transmitter comprising: a changing portion changing a setting of the transmitter; an out-of-period determining portion determining whether or not a setting has been changed by said changing portion; a time measurement portion starting time measurement when the out-of-period determining portion determines that a setting has been changed; a within-period determining portion determining whether or not a further setting change has been performed by said changing portion within a predetermined period from the start of the time measurement; an updating portion updating setting information when the within-period determining portion determines that a further setting change has been performed; and a transmitting portion transmitting the setting information to a receiver when it is determined that the predetermined period has elapsed based on the time measurement by the time measurement portion.

According to another aspect, the present invention provides a setting information transmission/reception system, comprising: a transmitter that is connectable to a network and that transmits to a receiver via the network setting information specifying the transmitter's own settings, the transmitter including: a changing portion changing a setting of the transmitter; a notifying portion performing notification to a receiver when the setting is changed by the changing portion; and a transmitting portion transmitting information of the setting upon receipt of the request from the receiver; and a receiver that is connected to the network and that receives the setting information transmitted from the transmitter, the receiver including: an out-of-period determining portion determining whether or not notification has been received from the notifying portion; a time measurement portion starting time measurement when the out-of-period determining portion determines that notification has been received; a within-period determining portion determining whether or not a further notification has been performed from the notifying portion within a predetermined period from the start of the time measurement; a requesting portion requesting the transmitter to transmit the setting information when the predetermined period has elapsed based on time measurement by the time measurement portion; a request control portion controlling the requesting portion to fail to request the transmitter in response to the further notification; and a receiving portion receiving the setting information transmitted from the transmitting portion.

According to another aspect, the present invention provides a receiver connected to a network for receiving setting information from a transmitter via the network, the receiver comprising: an out-of-period determining portion determining whether or not notification has been received from a transmitter via a network; a time measurement portion starting time measurement when the out-of-period determining portion determines that notification has been received; a within-period determining portion determining whether or not a further notification has been performed from the transmitter within a predetermined period from the start of the time measurement; a requesting portion requesting the transmitter to transmit setting information of the transmitter when the predetermined period has elapsed based on time measurement by the time measurement portion; a request control portion controlling the requesting portion to fail to request the transmitter in response to the further notification; and a receiving portion receiving the setting information transmitted from the transmitting portion.

According to another aspect, the present invention provides a transmission program to be executed by a computer to operate as a transmitter connectable to a network for transmitting to a receiver via the network setting information specifying the transmitter's own settings, the transmission program comprising: a changing program changing a setting of the transmitter; an out-of-period determining program determining whether or not a setting has been changed by said changing portion; a time measurement program starting time measurement when the out-of-period determining program determines that a setting has been changed; a within-period determining program determining whether or not a further setting change has been performed by the changing program within a predetermined period from the start of the time measurement; an updating program updating setting information when the within-period determining program determines that a further setting change has been performed; and a transmitting program transmitting the setting information to a receiver when it is determined that the predetermined period has elapsed based on the time measurement by the time measurement program.

According to another aspect, the present invention provides a reception program to be executed by a computer to operate as a receiver connected to a network for receiving setting information from a transmitter via the network, the reception program comprising: an out-of-period determining program determining whether or not notification has been received from a transmitter via a network; a time measurement program starting time measurement when the out-of-period determining program determines that notification has been received; a within-period determining program determining whether or not a further notification has been performed from the transmitter within a predetermined period from the start of the time measurement a requesting program requesting the transmitter to transmit setting information of the transmitter when the predetermined period has elapsed based on time measurement by the time measurement program; a is request control program controlling the requesting program to fail to request the transmitter in response to the further notification; and a receiving program receiving the setting information transmitted from the transmitting program.

BRIEF DESCRIPTION OF THE DRAWINGS

The above and other objects, features and advantages of the invention will become more apparent from reading the following description of the preferred embodiments taken in connection with the accompanying drawings in which:

FIG. 7(A) is a timing chart showing printer-PC data transmission/reception timing according to the first embodiment;

FIG. 7(B) is a timing chart showing printer-directory server data transmission/reception timing according to a modification of the first embodiment;

FIG. 8 is a flowchart showing notification processing according to a second embodiment;

FIG. 14 is a timing chart showing printer-PC data transmission/reception timing according to the fourth embodiment;

FIG. 15 is a flowchart showing management tool processing according to a fifth embodiment;

FIG. 16(A) shows a network setting page NP displayed on a display 26;

FIG. 16(B) shows a printing setting page PP displayed on a display 26;

DETAILED DESCRIPTION OF THE PREFERRED EMBODIMENTS

Figure 1:
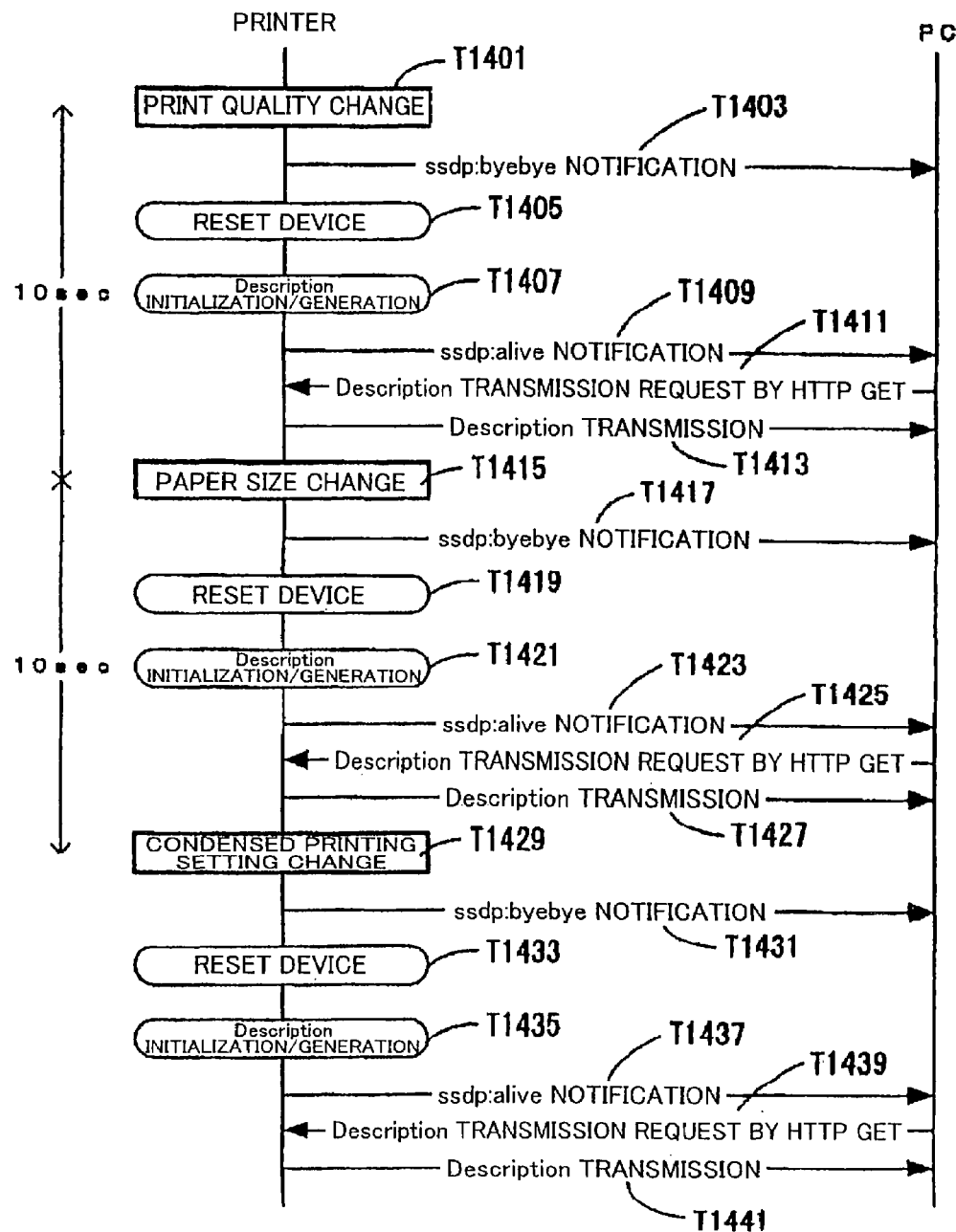
FIG. 1 is a timing chart showing conventional printer-PC data transmission/reception timing.

A setting information transmission/reception system according to preferred embodiments of the present invention will be described while referring to the accompanying drawings wherein like parts and components are designated by the same reference numerals to avoid duplicating description.

First Embodiment

First, a first embodiment of the present invention will be described while referring to FIG. 2 through FIG. 7(B).

Figure 2:
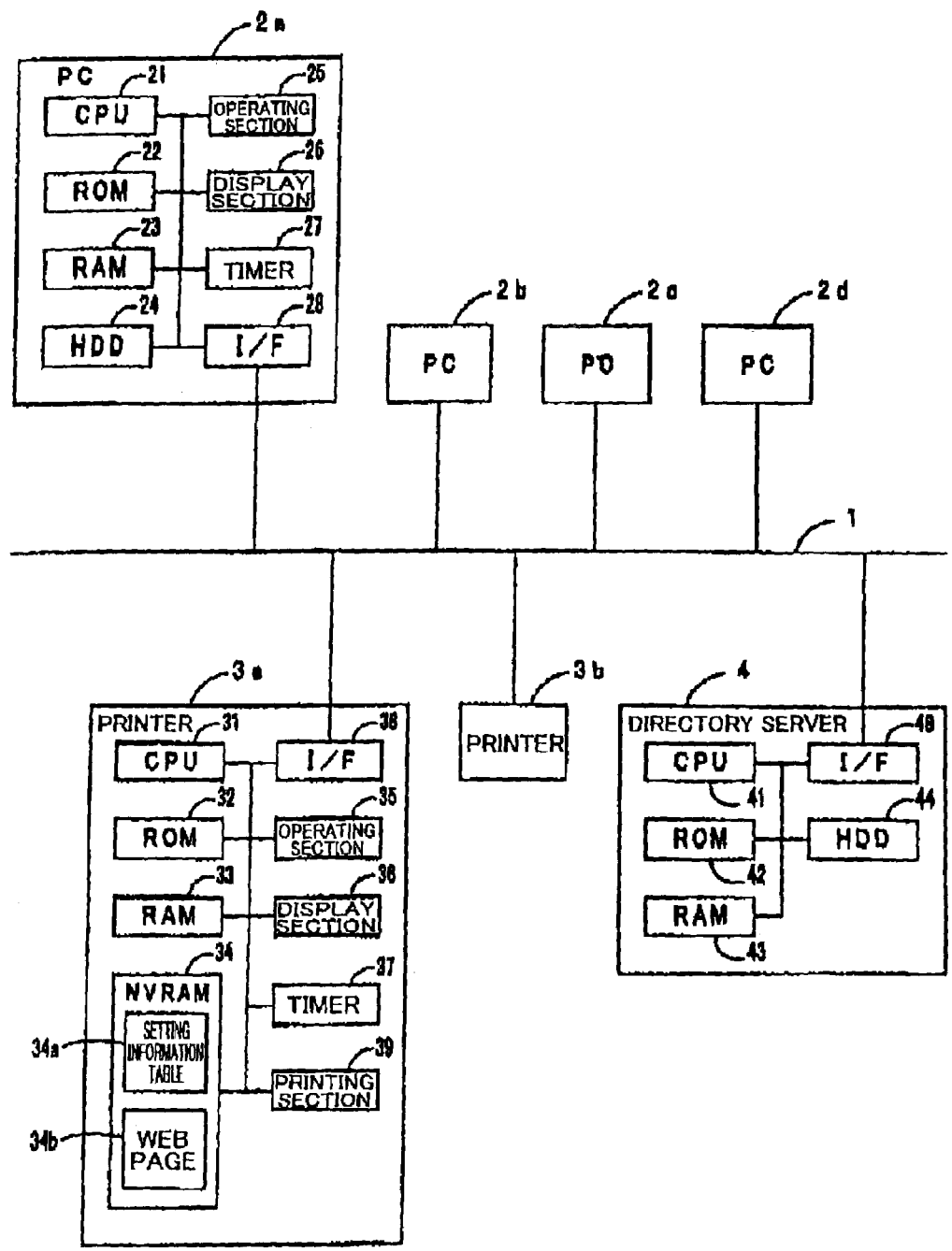
FIG. 2 is a schematic configuration diagram showing a network according to a first embodiment of the present invention.

FIG. 2 is a network configuration diagram relating to a LAN (Local Area Network) to which a setting information transmission/reception system according to the present embodiment is applied.

As shown in FIG. 2, a plurality of PCs (personal computers) 2 (2a through 2d), a plurality of printers 3 (3a and 3b), and a directory server 4 are connected to a network 1 according to this embodiment These network terminal devices (PCs 2, printers 3, and directory server 4) can be used cooperatively based on UPnP technology.

In the following description, the PCs 2 serve as so-called UPnP control points that function as controllers capable of detecting and controlling other network terminal devices (printers 3, in this example) in the network 1, and serve as "receivers". The printers 3 serve as so-called UPnP devices that are detected and controlled by the UpnP control points, and serve as "transmitters". Also, the directory server 4 is a server that manages the network terminal devices 2 and 3 connected to the network 1 by recording and updating device information for the network terminal devices, and also serves as a "receiver".

It is noted that in an actual UPnP network environment, one PC 2 may function as a UPnP control point while the other PC 2 functions as a UPnP device, and one printer 3 may function as a UPnP control point while the other printer 3 functions as a UPnP device. Here, however, it is assumed for the sake of simplicity that printers 3 always function as UPnP devices, and PCs 2 always function as UPnP control points for printers 3.

As shown in FIG. 2, each PC 2 includes: a CPU (Central Processing Unit) 21, ROM (Read Only Memory) 22, RAM (Random Access Memory) 23, HDD (Hard Disk Drive) 24, operating section 25, display section 26, timer 27, and network interface (I/F) 28. All the PCs 2 (2a through 2d) have the same configuration.

In each PC 2, the CPU 21 performs overall control and management of the components constituting the PC 2 based on various programs stored in the ROM 22 and HDD 24. The ROM 22 is a nonvolatile read-only storage medium that stores various programs to be executed by the CPU 21. The RAM 23 is a volatile readable/writable storage medium that temporarily stores results of processing by the CPU 21, a program downloaded from the ROM 22 or HDD 24, and so forth. The HDD 24 includes: a nonvolatile readable/writable storage medium; and a read/write device for that storage medium. The HDD 24 stores: various programs to be executed by the CPU 21, printer setting information transmitted from a printer 3, and so forth. The operating section 25 is an input device such as a keyboard and a mouse that convey user commands to the CPU 21. The display section 26 includes an LCD (Liquid Crystal-Display) or the like, and informs a user of CPU 21 processing results by displaying those results. The timer 27 performs time measurement processing based on commands from the CPU 21. The network interface 28 controls data transmission and reception to and from the network 1.

For example, the CPU 21 acquires a Web page (HTML data) 34b (described later) via the network interface 28 from some printer 3, and performs processing to display the Web page 34b on the display section 26. When a user operates the operating section 25 while viewing the Web page to designate his/her desire to change the default setting of the printer 3, for example, the CPU 21 transmits a command (a printer default setting change command) to the printer 3 via the network interface 28.

Each printer 3 includes: a CPU 31, ROM 32, RAM 33, NVRAM (Non Volatile RAM) 34, operating section 35, display section 36, timer 37, network interface 38, and printing section 39. All the printers 3a and 3b both have the same configuration.

In each printer 3, the CPU 31 performs overall control and management of the components constituting the printer 3 based on various programs stored in the ROM 32 and N 34. For example, the CPU 31 receives print data transmitted from a PC 2 via the network interface 38 and executes processing to control the printing section 39 to execute printing based on the received print data. The CPU 31 can also function as a Web server that executes a program stored in the NVRAM 34 and provides a Web page 34b stored in the NVRAM 34 (to be described later) to PCs 2.

The ROM 32 is a nonvolatile read-only storage medium that stores various programs to be executed by the CPU 31. The RAM 33 is a volatile readable/writable storage medium that temporarily stores results of processing by the CPU 31, a program downloaded from the ROM 32 or NVRAM 34, and so forth. The operating section 35 is a key-switch type input device that conveys user commands to the CPU 31. The display section 36 includes an LCD or the like, and informs a user of CPU 31 processing results by displaying those results. The timer 37 performs time measurement processing based on commands from the CPU 31. The network interface 38 controls data transmission and reception to and from the network 1. The printing section 39 prints print data transmitted from PCs 2. The printing section 39 is, for example, an electrophotographic image forming section provided with a photosensitive drum and laser scanner.

The NVRAM 34 is a nonvolatile readable/writable storage medium that stores various programs to be executed by the CPU 31. The NVRAM 34 also stores: a setting information table 34a holding various kinds of printer setting information in tabular form; and a Web page 34b written by HTML data. The printer setting information is setting information of the subject printer 3. Examples of the printer setting information include: network settings, and printing settings (default settings). Examples of the network settings: include settings of IP address, sub-net mask, and gateway address. Examples of the printing settings include: default settings of paper size, number of copies, print quality, enlargement/reduction ratio, multiple page function, boundary line when using the multiple page function, color/monochrome, and the like. A user can set these settings by operating the operating section 35. The user can also set these settings remotely by controlling some PC 2 to display the Web page 34b on the display section 26 of the subject PC 2 and by manipulating the operating section 25 of the PC 2.

The directory server 4 includes: a CPU 41, ROM 42, RAM 43, HDD 44, and network interface 48. The CPU 41 performs overall control and management of the components constituting the directory server 4 based on various programs stored in the ROM 42 and HDD 44. For example, the CPU 41 receives device information (device name and setting information) transmitted from printers 3 via the network interface 48 and provides PCs 2 and the like with a directory service based on the received device information. The ROM 42 is a nonvolatile read-only storage medium that stores various programs to be executed by the CPU 41. The RAM 43 is a volatile readable/writable storage medium that temporarily stores results of processing by the CPU 41, a program downloaded from the ROM 42 or HDD 44, and so forth. The HDD 44 is a nonvolatile readable/writable storage medium that stores various programs to be executed by the CPU 41, as well as device information and the like transmitted from printers 3 and the like. The network interface 48 controls data transmission and reception to and from the network 1.

Next, the method of changing printer settings of a printer 3 will be described while referring to FIG. 3.

Figure 3:
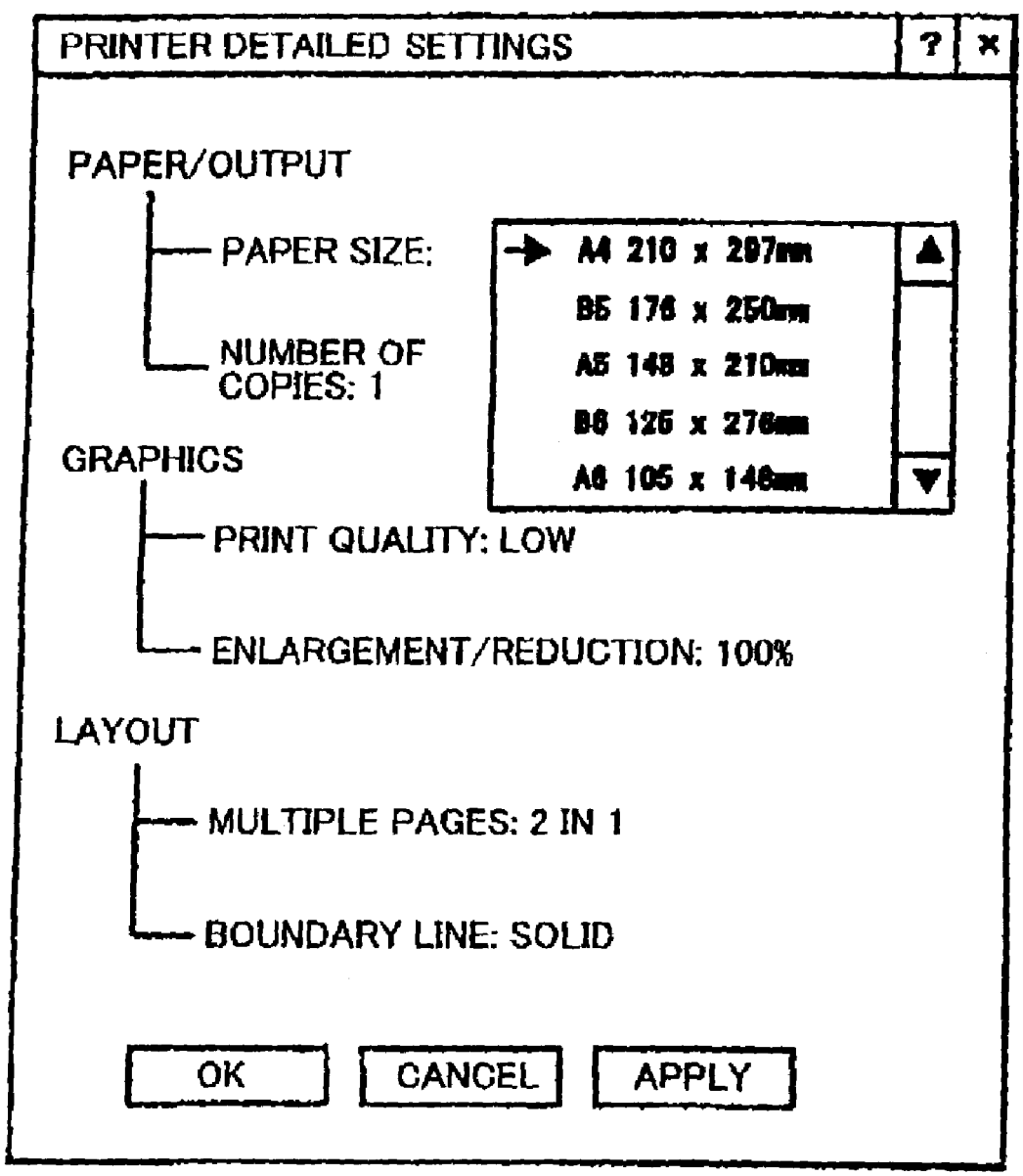
FIG. 3 is a drawing showing a printer setting screen according to the first embodiment.

FIG. 3 shows an example of a setting screen for setting the printer setting information of each printer 3. This setting screen is a display result of a Web page 34b, which is stored in the NVRAM 34 of a corresponding printer 3 and which is supplied to one PC 2 and displayed on the display section 26 of the subject PC 2. While viewing the setting screen, the PC 2 user can change each item displayed on the setting screen to his/her desired setting by manipulating the operating section 25.

As shown in the figure, this setting screen allows three broad kinds of settings to be made: "Paper/Output", "Graphics", and "Layout". Under the "Paper/Output" heading, the "Paper Size" item allows the printing paper size to be selected from options A4, B5, A5, B6, and A6, while the "Number of Copies" item allows setting of the number of copies of print data to be printed when the print data is received from the PC 2 (in the figure, "A4" is specified for "Paper Size", and "1" for "Number of Copies"). Under the "Graphics" heading, the "Print Quality" item allows setting of the print quality for output of print data received from the PC 2, while the "Enlargement/Reduction" item allows setting of an enlargement/reduction ratio (as a percentage) for print data received from the PC 2 (in the figure, "Low" is specified for "Print Quality", and "100%" for "Enlargement/Reduction"). Under the "Layout" heading, the "Multiple Pages" item allows setting of the number of pages of print data received from the PC 2 to be condensed into a single sheet of paper, while the "Boundary Line" item allows setting of whether or not a boundary line is to be printed between adjacent pages in condensed printing, and what kind of boundary line is to be printed (in the figure, "2-in-1" is specified for "Multiple Pages" and "Solid" for "Boundary Line".

Three buttons—"OK", "Cancel", and "Apply"—are provided at the bottom of this setting screen. When the "OK" button is selected using the operating section 25, all the settings shown in FIG. 3 are assumed to be finalized, the setting contents are notified to the printer 3, and setting information stored in the setting information table 34a in the NVRAM 34 is updated. Also, when this "OK" button is selected, setting changes made by the user are assumed to have been completed, and this setting screen is closed. If, on the other hand, the "Cancel" button is selected using the operating section 25, even if changes have been made to items in the setting screen, the setting screen is closed without those changes being notified to the printer 3. If the "Apply" button is selected using the operating section 25, setting contents at that point are notified to the printer 3 and setting information stored in the setting information table 34a in the NVRAM 34 is updated, in the same way as when the "OK" button is selected. However, when the "Apply" button is selected, it is assumed that further setting changes are to be made by the user, and therefore the setting screen is not closed but continues to be displayed. The setting screen shown in FIG. 3 has been described as being displayed on the display section 26 of a PC 2 and being manipulated by the user using the operating section 25 of the PC 2, but the same kind of processing may be performed using the operating section 35 and display section 36 of the printer 3, per se.

Printer settings made according to the above-described processing are stored as new printer default settings in the setting information table 34a of the NVRAM 34, and the settings stored in this setting information table 34a will be used when power is turned on again. Also, when a default setting of "Print Quality"=Low is set for printer 3a, for example, printing will be executed at low quality unless a PC 2 (2a, 2b, 2c, Or 2d) that transmits print data to this printer 3a specifies a desired "Print Quality" when issuing a print command.

According to the present embodiment, the contents of the setting changes made for a printer 3 are transmitted to a PC 2 in a manner as described below with referring to FIG. 4 through FIG. 6.

Figure 4:
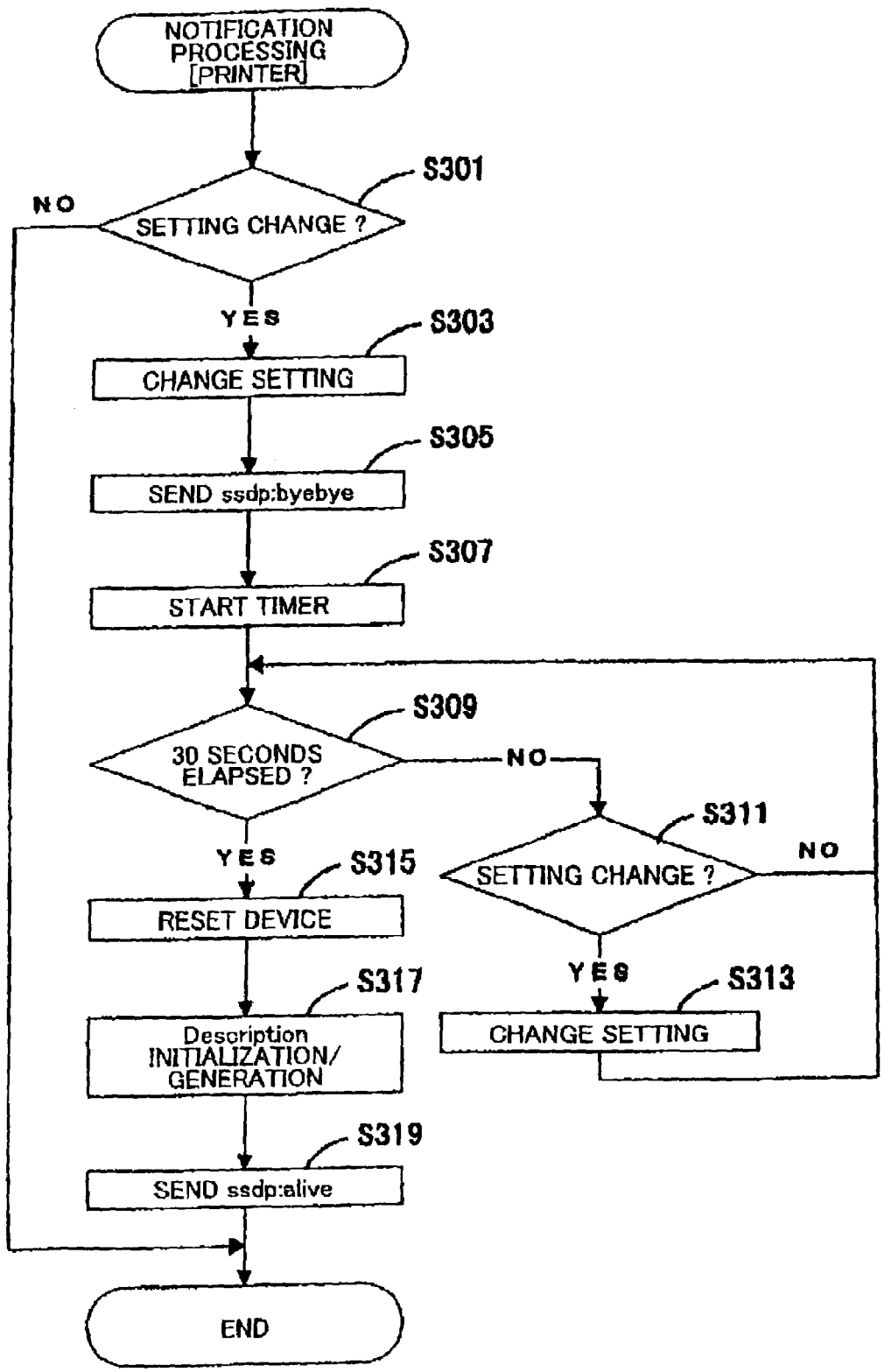
FIG. 4 is a flowchart showing notification processing according to a first embodiment.

FIG. 4 shows the operation of each printer 3 when its CPU 31 executes a notification program stored in the NVRAM 34 of the printer 3. FIG. 6 shows the operation of each printer 3 when its CPU 31 executes a response program stored in the NVRAM 34 of the printer 3. The processes of FIG. 4 and FIG. 6 are each executed independently at predetermined intervals. FIG. 5 shows the operation of each PC 2 when its CPU 21 executes a description request program stored in the HDD 24 of the PC 2. The processing of FIG. 5 is executed at predetermined intervals.

By executing the processing of FIG. 4, each printer 3 can perform notification to PCs 2 when printer settings of the printer 3 are changed. By executing the processing of FIG. 5, each PC 2 can request, upon receipt of the notification from some printer 3, the subject printer 3 to send the PC 2 a Description (XML (Extensible Markup Language) data) that contains information of the printer settings that is written according to an XML format. By executing the processing of FIG. 6, the printer 3 can respond to the PC 2 upon receipt of the request from the subject PC 2.

First, notification processing executed by the CPU 31 of each printer 3 will be described while referring to FIG. 4.

When this notification processing is started, it is first judged in S301 whether or not a printer setting for the subject printer 3 has been changed. More specifically, it is judged whether or not a printer setting has been changed by user manipulation of the operating section 25 of some PC 2 or the operating section 35 of the subject printer 3. If it is determined that there is no printer setting change (S301; NO), the notification processing is terminated.

If, on the other hand, it is determined in S301 that there is a printer setting change (S301: YES), a printer setting is changed in S303 in accordance with the user's designated setting changes. More specifically, information in the setting information table 34a is updated based on a new setting designated by the user.

Then, after the S303 processing has been performed, a signal of ssdp:byebye is broadcasted in S305 to the PCs 2 (2a through 2d (UPnP control points)) that are connected to the network 1, thereby giving notification that the subject printer 3 is leaving the network 1. The connection of the printer 3 to the network 1 via the interface 38 is disconnected.

After the S305 processing has been performed, the CPU 31 issues in S307 a command to the timer 37 to start time measurement. As a result, the timer 37 starts time measurement in response to this command.

Then, when the S307 processing has been performed, it is next judged in S309, based on the time measurement result by the timer 37, whether or not thirty (30) seconds have elapsed since the time measurement was started.

If it is determined that 30 seconds have not yet elapsed since time measurement was started (S309: NO), the processing flow proceeds to S311. On the other hand, if it is determined that 30 seconds have elapsed since time measurement was started (S309: YES), the processing flow proceeds to S315.

In S311, it is judged whether or not there is another printer setting change. In S311, the same processing as in S301 is executed. That is to say, it is determined whether or not a further setting change has been designated by the user while 30 seconds have not yet elapsed since time measurement was started (S309: NO). If it is determined in S311 that there is a further printer setting change (S311: YES), the same processing as in S303 is performed. That is, information in the setting information table 34a is updated (S313). Then, the processing flow returns to S309, If it is determined in S311 that there is no printer setting is change (S311: NO), the processing flow returns directly to S309.

If, on the other hand, it is determined in S309 that 30 seconds have elapsed since time measurement was started (S309: YES), a printer reset processing is performed (S315), and the processing flow proceeds to S317.

In S317, processing is performed to initialize the Description, thereby deleting the Description that contains information of the printer settings prior to the setting change(s) newly executed by S301 or S311, and to generate a new Description based on the contents of the setting information table 34a newly updated by S303 or S313 processing. More specifically, a Description is generated that reflects the settings for paper size, print quality, etc., newly set in the printer setting screen shown in FIG. 3.

Then, after the S317 processing has been performed, a signal ssdp:alive is broadcasted in S319 to the PCs 2 (2a through 2d/UPnP control points) that are connected to the network 1, thereby giving notification that the subject printer 3 has just joined the network 1, and the notification processing is terminated. The printer 3 is brought back into connection with the network 1 via the interface 38 again.

Next, a Description request processing executed by the CPU 21 of each PC 2 will be described while referring to FIG. 5.

When this Description request processing is started, it is first judged in S401 whether or not a signal ssdp;alive has been received from any printer 3. If it is determined that ssdp:alive has not been received (S401: NO), the Description request processing is terminated directly. If, on the other hand, it is determined that ssdp:alive has been received from some printer 3 (S401: YES), the processing flow proceeds to S403.

In S403, based on the ssdp:alive, processing is performed to request the printer 3 that has sent ssdp:alive to send a Description containing setting information of the subject printer 3. Because the Description is written by using XML data, the PC 2 sends an HTTP GET command to the printer 3 to request the subject printer 3 to send XML Description data back to the PC 2.

Next, response processing executed by the CPU 31 of each printer 3 will be described while referring to FIG. 6.

When this response processing is started, it is first judged in S501 whether or not any HTTP GET command has been received from any PC 2. If it is determined that an HTTP GET command has not been received (S501: NO), the response processing is terminated.

If, on the other hand, it is determined that an HTTP GET command has been received (S501: YES), it is judged in S503 whether or not the received HTTP GET command requests a Description for the printer. More specifically, it is judged whether or not the HTTP GET command is an HTTP GET command that has been sent in S403 from some PC 2 during the above-described Description request processing (FIG. 5).

If it is determined in S503 that the HTTP GET command requests a printer-related Description (S503: YES), the processing flow proceeds to S505. If, on the other hand, it is determined that the HTTP GET command does not request a printer-related Description (S503; NO), the processing flow proceeds to S507.

In S505, the Description generated in S317 of the notification processing (FIG. 4) is sent to the PC 2 that has requested by the HTTP GET command, and the response processing is terminated.

In S507, on the other hand, processing in accordance with the received HTTP GET command is performed. For example, processing is executed to send a Web page 34b stored in the NVRAM 34 of the subject printer 3 to the PC 2 that has sent the HTTP GET command. Then, the response processing is terminated.

Figure 5:
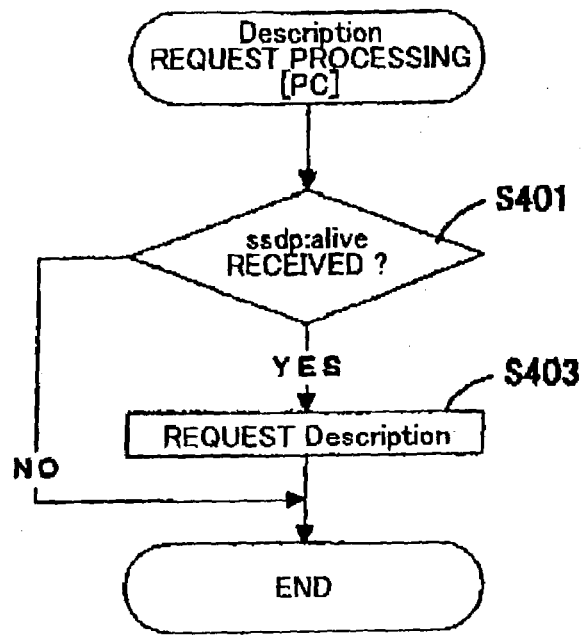
FIG. 5 is a flowchart showing Description request processing according to the first embodiment.
Figure 6:
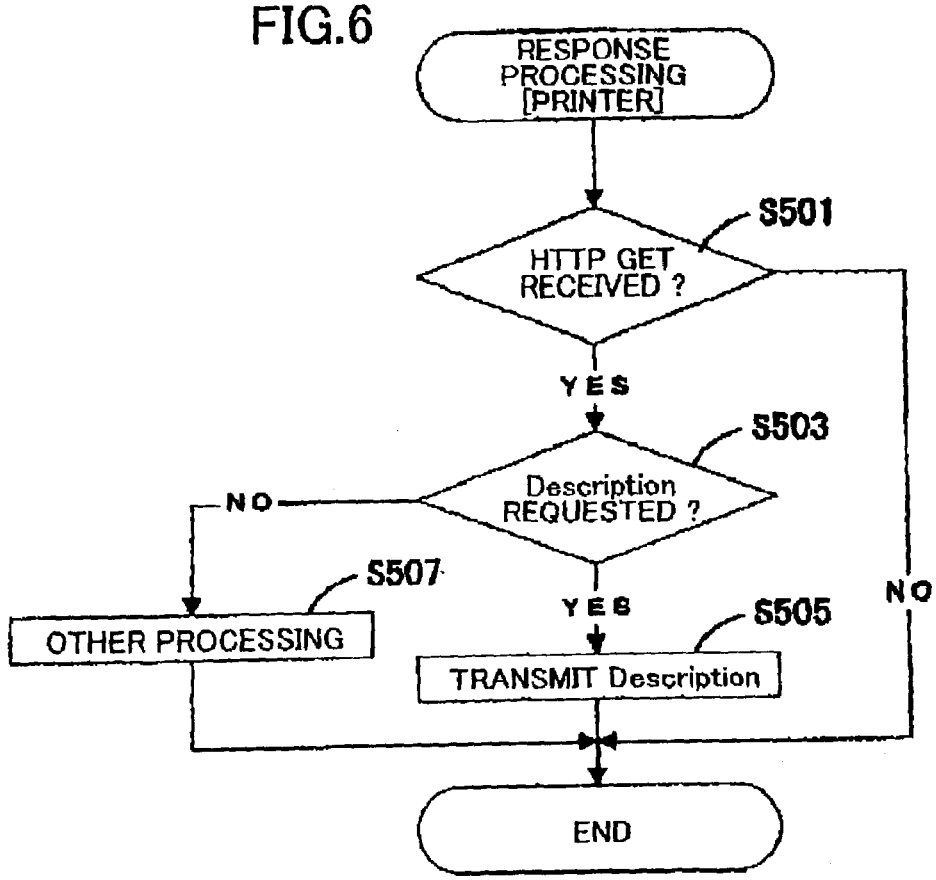
FIG. 6 is a flowchart showing response processing according to the first embodiment.

While referring to the timing chart shown in FIG. 7(A), next will be described sample operations when the above-described processings in FIG. 4 through FIG. 6 are actually carried out. It is now assumed that a user consecutively changes the default settings of one printer 3 for its print quality, paper size, and multiple page printing, at ten-second intervals.

First, when the default setting for print quality is changed by the user, such as a change from low quality to medium quality, for example, (T601, corresponding to S301: YES in FIG. 4), information in the setting information table 34a is updated (corresponding to S303 in FIG. 4), and then ssdp:byebye is sent to PCs 2 (T603, corresponding to S305 in FIG. 4).

After ssdp:byebye is sent, time measurement by the timer 37 is started (T605, corresponding to S307 in FIG. 4). In this example, a change in the paper size default setting (T607, corresponding to S311: YES in FIG. 4) and a change in the multiple page printing (condensed printing) default setting (T609, corresponding to S311: YES in FIG. 4) are made before the elapse of 30 seconds from the start of time measurement by the timer 37. Accordingly, information in the setting information table 34a is updated successively at the timings of the respective setting changes (corresponding to S313 in FIG. 4).

Then, when 30 seconds have elapsed since time measurement by the timer 37 was started (corresponding to S309: YES in FIG. 4), a printer reset operation (T611, corresponding to S315 in FIG. 4) and Description initialization/generation operation (T613, corresponding to S317 in FIG. 4) are executed. Then, ssdp:alive is sent to the PCs 2 (T615, corresponding to S319 in FIG. 4).

When the PC 2 receives this ssdp:alive (corresponding to S401: YES in FIG. 5), the PC 2 sends to the printer 3 a Description transmission request in the form of an HTTP GET command (T617, corresponding to S403 in FIG. 5). Upon receipt of the request, the printer 3 sends a Description, and the PC 2 acquires the Description (T619, corresponding to S501: YES, S503: YES, and S505 in FIG. 6).

As described above, according to the setting information transmission/reception system of the first embodiment, the printer 3 determines whether or not a printer setting has been changed by the PC operating section 25 or printer operating section 35. When some printer setting has been changed, on the basis of the printer setting change (corresponding to S301: YES in FIG. 4, T601 in FIG. 7(A)), time measurement by timer 37 is started (corresponding to S307 in FIG. 4, T605 in FIG. 7(A)). Then, when it is confirmed by the timer 37 that a predetermined period has elapsed (corresponding to S309: YES in FIG. 4), ssdp:alive is sent to the PCs 2 (corresponding to S319 in FIG. 4, T615 in FIG. 7(A)).

The printer 3 further determines whether or not a further printer setting change has been made within the predetermined period (S309: NO) (corresponding to S311 in FIG. 4). Each time it is determined that a further setting change has been made (corresponding to S311: YES in FIG. 4, T607 and T609 in FIG. 7(A)), the setting information table 34a is updated (corresponding to S313 in FIG. 4).

Upon receipt of ssdp:alive (corresponding to S401: YES in FIG. 5), the PC 2 requests the subject printer 3 Description transmission by sending an HTTF GET command to the subject printer 3 (corresponding to S403 in FIG. 5, T617 in FIG. 7(A)).

Upon receiving this HTTP GET command (corresponding to S501: YES, S503: YES in FIG. 6), the printer 3 performs Description transmission to the PC 2 that has requested (corresponding to S505 in FIG. 6, T619 in FIG. 7(A)), and the PC 2 receives this description via the network interface 28.

In this way, when a setting relating to the print quality of the printer 3 is changed (T601), sending of ssdp:byebye to PCs 2 (T603) and time measurement by the timer 37 (T605) are executed. Then, after the elapse of 30 seconds from the start of time measurement by the timer 37, ssdp:alive is sent to the PCs 2 (T615). Even if a paper size related setting change (T607) or multiple page printing (condensed printing) setting change (T609) is made during this 30-second interval, ssdp:alive is not sent to the PCs 2 for those changes executed during the 30-second interval.

Thus, when several additional setting changes are performed successively within the predetermined period after a first printer setting has been changed, notifications to PCs 2 are partially omitted but notifications are combined together into one and notification is sent to PCs 2 only once. Accordingly, notification is no longer sent to PCs 2 each time a printer setting is changed.

Also, through the omission of such notifications, setting information transmission requests from a PC 2 to a printer 3 executed on the basis of these notifications, and setting information transmissions from a printer 3 to a PC 2 executed on the basis of these transmission requests, are also effectively curtailed. By collecting together notifications for setting changes acknowledged within the short period, and by omitting some notifications, it is possible to reduce the load on the network 1. When there are a plurality of UPnP control points in the network 1, in particular, the load imposed on the network 1 may be multiplied by the number of those UPnP control points, and thus the effect of omitting notifications as described above is especially evident.

As described above, according to the first embodiment, when a printer setting (transmitter setting) is changed, it is determined that a transmitter-related setting has been changed. When it is determined that a transmitter related setting has been changed, time measurement is started. Then, when a predetermined period has elapsed based on time measurement, the transmitter sends notification to PCs (receivers). On receiving this notification, the PC (receiver) requests the printer (transmitter) to transmit setting information, and on receiving this request, the transmitter transmits setting information. If it is determined that a further setting change has been made within the predetermined period, setting information to be transmitted to the receiver is updated.

Accordingly, notifications are not sent to the PCs (receivers) independently for the first transmitter-related setting change and the further setting change(s) made within the predetermined period after the first change, and thus the amount of data sending on the network can be decreased, and the load imposed on the network can assuredly be reduced.

According to the present embodiment, the printer (transmitter) leaves the network by being disconnected from the network when a setting change is occurred, and joins the network by being connected to the network when notification is sent to the PCs.

In this way, the setting information transmission/reception system of the present embodiment can be applied to a general network environment, in which transmitters leave the network on the basis of a setting change, and joins the network when notification is performed.

<Modification>

In the above-described first embodiment, a Description request from a PC 2 to a printer 3 (T617 in FIG. 7(A)) is issued when the PC 2 receives ssdp:alive from the printer 3 (T615 in FIG. 7(A)), and the printer 3 transmits a Description to the PC 2 in response to this request (T619 in FIG. 7(A)). However, this is not a limitation, and a configuration may also be used whereby setting information is transmitted from a printer 3 unilaterally when there is no request from a PC 2.

To describe one example of such a configuration in simple terms, a configuration can be considered, for example, in which device information of the printer is transmitted from the printer 3 to the directory server 4. In this configuration, data transmission and reception is carried out using LDAP (Lightweight Directory Access Protocol), for example. Since there is UPnP-specific processing and LDAP-specific processing, partially differing processing arises, but with the exception of these parts, essentially the same kind of processing as described above can be performed.

More specifically, when printer settings are successively changed on the printer 3 in the same manner as shown in FIG. 7(A), in order to transmit device information of the printer 3 to the directory server 4, as shown in FIG. 7(B), processing of ssdp:byebye transmission in UPnP (S305 in FIG. 4, T603 in FIG. 7(A)), processing of ssdp:alive transmission in UPnP (S319 in FIG. 4, T615 in FIG. 7(A)), and processing to request a Description by an HTTF GET command (S403 in FIG. 5, T617 in FIG. 7(A)), is eliminated since equivalent processing does not exist in LDAP. Processing is executed to transmit device information from a printer 3 in LDAP (specifically, LDAP: Modify Request) (T619') directly after the Description initialization/generation (T613). This processing is similar to the processing for transmitting a Description (S505 in FIG. 6, T619 in FIG. 7(A)). Furthermore, at the end, the directory server 4 executes an additional processing (T620) to transmit a response signal indicating that the directory server 4 has received device information (specifically, LDAP: Modify Response). Thus, device information transmissions to a directory server 4 are partially omitted and a plurality of device information transmissions are combined into one with regard to further setting changes carried out within the predetermined period (30 seconds) after a printer setting has been changed first, in the same way as in the above-described first embodiment, and thus the load on the network 1 can be reduced.

As described above, according to the modification, when a printer setting (transmitter setting) is changed, it is determined that a transmitter related setting has been changed. When it is determined that a transmitter related setting has been changed, time measurement is started. Then, when a predetermined period has elapsed based on time measurement, the printer (transmitter) sends setting information to the receiver. If it is determined that a further setting change has been made within the predetermined period, setting information to be transmitted to the PC (receiver) is updated.

Accordingly, notifications are not sent to the PCs (receivers) independently for the first transmitter-related setting change and the further setting change(s) made within the predetermined period after the first change, and thus the amount of data sending on the network can be decreased, and the load imposed on the network can assuredly be reduced.

In the above-described first embodiment and modification, an example has been described in which the program relating to notification processing shown in FIG. 4 and the program relating to response processing shown in FIG. 6 are stored in the NVRAM 34 of a printer 3, but these programs may be stored in other storage media such as a flexible disk, magneto-optical disk, CD-ROM, hard disk, ROM, or RAM. Similarly, in the above-described first embodiment, an example has been described in which the program relating to Description request processing shown in FIG. 5 is stored in the HDD 24 of a PC 2, but this program may be stored in other storage media such as a flexible disk, magneto-optical disk, CD-ROM, hard disk, ROM, or RAM. Furthermore, in the above-described first embodiment, an example has been described in which the network load is reduced by combining together ssdp:alive transmissions, but the network load can be reduced by combining together ssdp:byebye transmissions.

Second Embodiment

Figure 9:
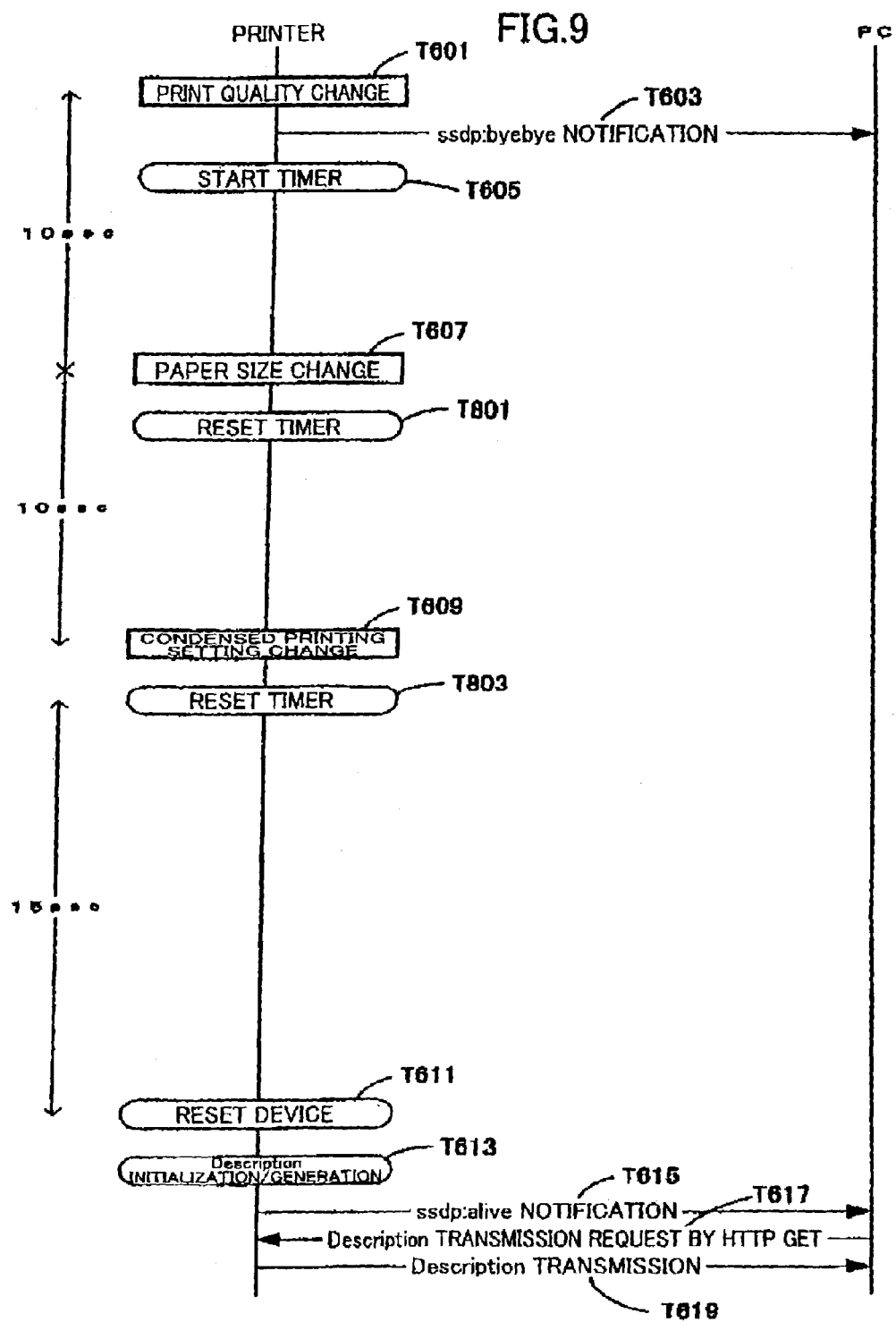
FIG. 9 is a timing chart showing printer-PC data transmission/reception timing according to the second embodiment.

Next, a second embodiment of the present invention will be described while referring mainly to FIG. 8 and FIG. 9. The second embodiment described below differs from the first embodiment only in part of the notification processing executed by a printer 3, and therefore the description will concentrate on this different part. In the following description, components and processing steps identical to those in the first embodiment are assigned the same reference numerals as in the first embodiment.

FIG. 8 shows the notification processing executed by a printer 3. This notification processing is executed when the CPU 31 executes a notification program stored in the NVRAM 34 of the printer 3.

The notification processing shown in FIG. 8 differs from the notification processing shown in FIG. 4 in the first embodiment in that S701 processing is executed instead of the S309 processing in FIG. 4, and S703 processing is executed after the S313 processing in FIG. 4. Specifically, whereas in S309 it was determined whether or not 30 seconds had elapsed since time measurement by the timer 37 was started, in S701 processing is performed to determine whether or not 15 seconds have elapsed since time measurement by the timer 37 was started. And in S703, processing is performed to reset (initialize) time measurement by the timer 37.

It is noted that according to the present embodiment, the PC 2 executes the description request process of FIG. 5 and the printer 3 executes the response process of FIG. 6 in the same manner as in the first embodiment.

Sample operations when the processing steps in the second embodiment are actually carried out will be described here while referring to the flowcharts shown in FIG. 5, FIG. 6, and FIG. 8, and the timing chart shown in FIG. 9. In describing sample operations according to the second embodiment, the same example will be taken as in the first embodiment—that is, an example in which a user consecutively changes the default settings for printer 3 print quality, paper size, and multiple page printing, at 10-second intervals.

First, when the default setting for printer 3 print quality is changed by a user, such as a change from low quality to medium quality, for example, (corresponding to S301: YES in FIG. 8, T601 in FIG. 9), information in the setting information table 34a provided in the NVRAM 34 is updated (corresponding to S303 in FIG. 8), and then ssdp:byebye is sent to PCs 2 (corresponding to S305 in FIG. 8, T603 in FIG. 9). After ssdp:byebye is sent, time measurement by the timer 37 is started (corresponding to S307 in FIG. 8, T605 in FIG. 9). In this example, the paper size default setting is changed before the elapse of 15 seconds from the start of time measurement by the timer 37 (corresponding to S311: YES in FIG. 8, T607 in FIG. 9), and the multiple page printing (condensed printing) default setting is changed before the elapse of 15 seconds from the paper size default setting change (corresponding to S311: YES in FIG. 8, T609 in FIG. 9). Accordingly, at the timings of the respective setting changes, information in the setting information table 34a provided in the NVRAM 34 is updated (corresponding to S313 in FIG. 8) and time measurement by the timer 37 is reset (corresponding to S703 10 in FIG. 8, T801 and T803 in FIG. 9). That is to say, when a further setting change is made before 15-second time measurement is completed, 15-second time measurement is restarted. Then, when 15 seconds have elapsed since time measurement by the timer 37 was started (corresponding to S701: YES in FIG. 8), a printer reset operation (corresponding to S315 in FIG. 8, T611 in FIG. 9) and Description initialization/generation operation (corresponding to S317 in FIG. 8, T613 in FIG. 9) are executed, and ssdp:alive is sent to the PCs 2 (corresponding to S319 in FIG. 8, T615 in FIG. 9). Upon receipt of ssdp:alive (corresponding to S401: YES in FIG. 5), a PC 2 makes a Description request to the printer 3 by using an HTTP GET command (corresponding to S403 in FIG. 5, T617 in FIG. 9), and the PC 2 acquires a Description sent from the printer 3 that has received this request (corresponding to S501: YES, S503: YES, and S505 in FIG. 6, and T619 in FIG. 9).

As described above, according to the setting information transmission/reception system of the second embodiment, it is determined whether or not a printer setting has been changed at the PC 2 operating section 25 or printer 3 operating section 35, and on the basis of a printer setting change (corresponding to S301: YES in FIG. 8, T601 in FIG. 9), time measurement by timer 37 is started (corresponding to S307 in FIG. 8, T605 in FIG. 9). Then, when it is confirmed by the timer 37 that a predetermined period has elapsed (corresponding to S701: YES in FIG. 8), ssdp:alive is sent to the PCs 2 (corresponding to S319 in FIG. 8, T615 in FIG. 9).

Also, determination of whether or not a further printer setting change has been made within the predetermined period (S701: NO in FIG. 8) is performed (corresponding to S311 in FIG. 8), and each time it is determined that a further setting change has been made (corresponding to S311: YES in FIG. 8, T607 and T609 in FIG. 9), setting information table 34a updating is performed (corresponding to S313 in FIG. 8), and time measurement by the timer 37 is reset and the period is extended (corresponding to S703 in FIG. 8, T801 and T803 in FIG. 9).

Upon receipt of ssdp:alive (corresponding to S401: YES in FIG. 5), a PC 2 requests Description transmission by sending an HTTP GET command to the printer 3 (corresponding to S403 in FIG. 5, T617 in FIG. 9). On receiving this HTTP GET command (corresponding to S501: YES, S503: YES in FIG. 6), the printer 3 performs Description transmission to the PC 2 (corresponding to S505 in FIG. 6, T619 in FIG. 9), and the PC 2 receives this description via the network interface 28.

In this way, similarly to the first embodiment, notifications to PCs 2 are partially omitted and a plurality of notifications are combined into one when further setting changes are performed within a predetermined period after a printer setting has been changed, and notification is no longer sent to a PC 2 each time a printer setting is changed. Also, through the omission of such notifications, setting information transmission requests from a PC 2 to a printer 3 made on the basis of these notifications, and setting information transmissions from a printer 3 to a PC 2 performed on the basis of these transmission requests, are also effectively curtailed. That is to say, by collecting together notifications for setting changes acknowledged within a short period, and omitting some notifications, it is possible to reduce the load on the network 1.

In the above-described the second embodiment, a Description request from a PC 2 to a printer 3 (T617 in FIG. 9) is issued when the PC 2 receives ssdp:alive transmitted by the printer 3 (T615 in FIG. 9), and the printer 3 transmits a Description to the PC 2 in response to this request (T619 in FIG. 9), but this is not a limitation, and a configuration may also be used whereby setting information is transmitted from a printer 3 unilaterally when there is no request from a PC 2.

To describe one example of such a configuration in simple terms, a configuration can be considered, for example, in which device information of the printer 3 is transmitted to the directory server 4 similarly to the modification of the first embodiment. In this configuration, data transmission and reception may be carried out according to LDAP, for example. Since there is consequently UPnP-specific processing and LDAP-specific processing, partially differing processing occurs, but with the exception of these parts, essentially the same kind of processing as described above can be performed. That is to say, processing relating to ssdp:byebye transmission in UPnP (S305 in FIG. 8, T603 in FIG. 9), processing relating to ssdp:alive transmission in UPnP (S319 in FIG. 8, T615 in FIG. 9), and processing to request a Description by using an HTTP GET command (S403 in FIG. 5, T617 in FIG. 9), is eliminated since equivalent processing does not exist in LDAP. Also, the processing for transmitting a Description (S505 in FIG. 6, T619 in FIG. 9) resembles processing for transmitting device information from a printer 3 in LDAP (specifically, LDAP: Modify Request), and so replaces that processing. Furthermore, in LDAP, processing is performed for transmitting a response signal indicating that device information has been received (specifically, LDAP; Modify Response), and therefore that processing is added at the end. Thus, device information transmissions to a directory server are partially omitted (a plurality of device information transmissions are combined into one) with regard to further setting changes carried out within a predetermined period after a printer setting has been changed, in the same way as in the above-described second embodiment, and thus the load on the network 1 can be reduced.

As described above, according to the second embodiment, if it is determined that a further setting change has been made within the predetermined period, the period is extended, and the period until notification or setting information transmission by the transmitter increases. In this way, when a further change is made within the predetermined period, the period is extended, thereby enabling the amount of data sending on the network to be further decreased In the above-described second embodiment, an example has been described in which the program relating to notification processing shown in FIG. 8 is stored in the NVRAM 34 of a printer 3, but this is not a limitation, and this program may also be stored in a storage medium such as a flexible disk, magneto-optical disk, CD-ROM, hard disk, ROM, or RAM. Also, in the above-described second embodiment, an example has been described in which, when a further setting change is confirmed within a predetermined period (S311: YES in FIG. 8), the predetermined period is extended by performing timer 37 reset processing (S703 in FIG. 8) but this is not a limitation, and other processing may be used as long as it is processing that extends the predetermined period. For example, in S703, it is possible to subtract a predetermined amount of time from the measurement result of the timer 37.

Furthermore, in the above-described second embodiment, an example has been described in which the network load is reduced by carrying out batch ssdp:alive transmission as appropriate, but this is not a limitation, and a configuration may also be used whereby the network load is reduced by carrying out batch ssdp:byebye transmission.

Third Embodiment

Next, a third embodiment of the present invention will be described while referring mainly to FIG. 10 through FIG. 12. The third embodiment described below differs from the first embodiment only in the notification processing executed by a printer 3 and the Description request processing executed by a PC 2, and therefore the description will concentrate on these different parts. In the following description, components and processing steps identical to those in the first embodiment are assigned the same reference numerals as in the first embodiment.

Figure 10:
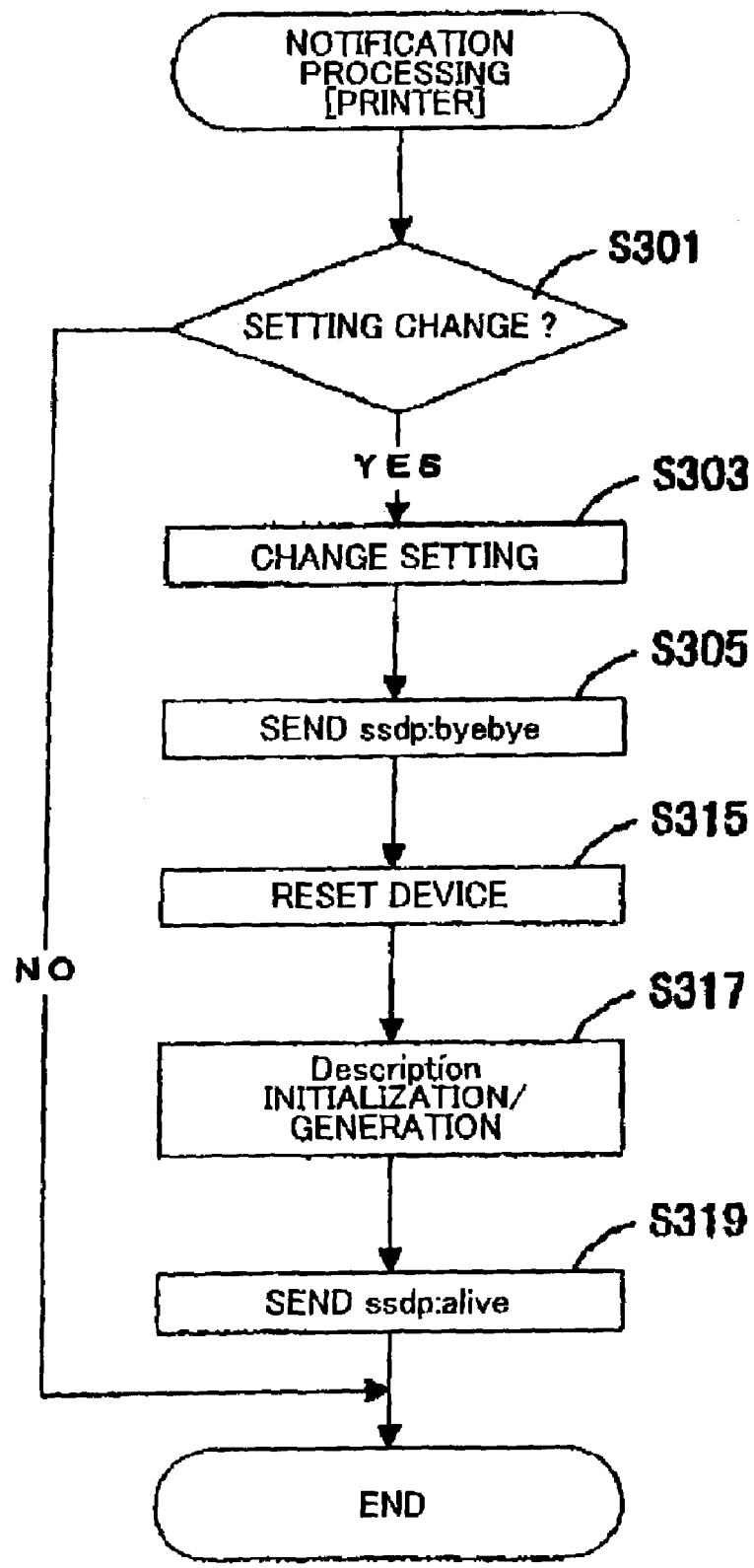
FIG. 10 is a flowchart showing notification processing according to a third embodiment.

FIG. 10 shows the notification processing executed by a printer 3, that is, the operation of a printer 3 when the CPU 31 executes a notification program stored in the NVRAM 34 of the printer 3, as in FIG. 4 in the first embodiment.

The notification processing shown in FIG. 10 differs from the notification processing shown in FIG. 4 in the first embodiment in that processing steps S307 through S313 in FIG. 4 are eliminated. That is to say, in the notification processing shown in FIG. 10, time measurement processing by the timer 37 (S307) and processing steps executed as appropriate according to the time measurement situation (S309 through S313) are not performed, and ssdp:byebye and ssdp: alive are sent unconditionally (S305, S319) each time a setting change is determined to have been made (S301: YES).

Figure 11:
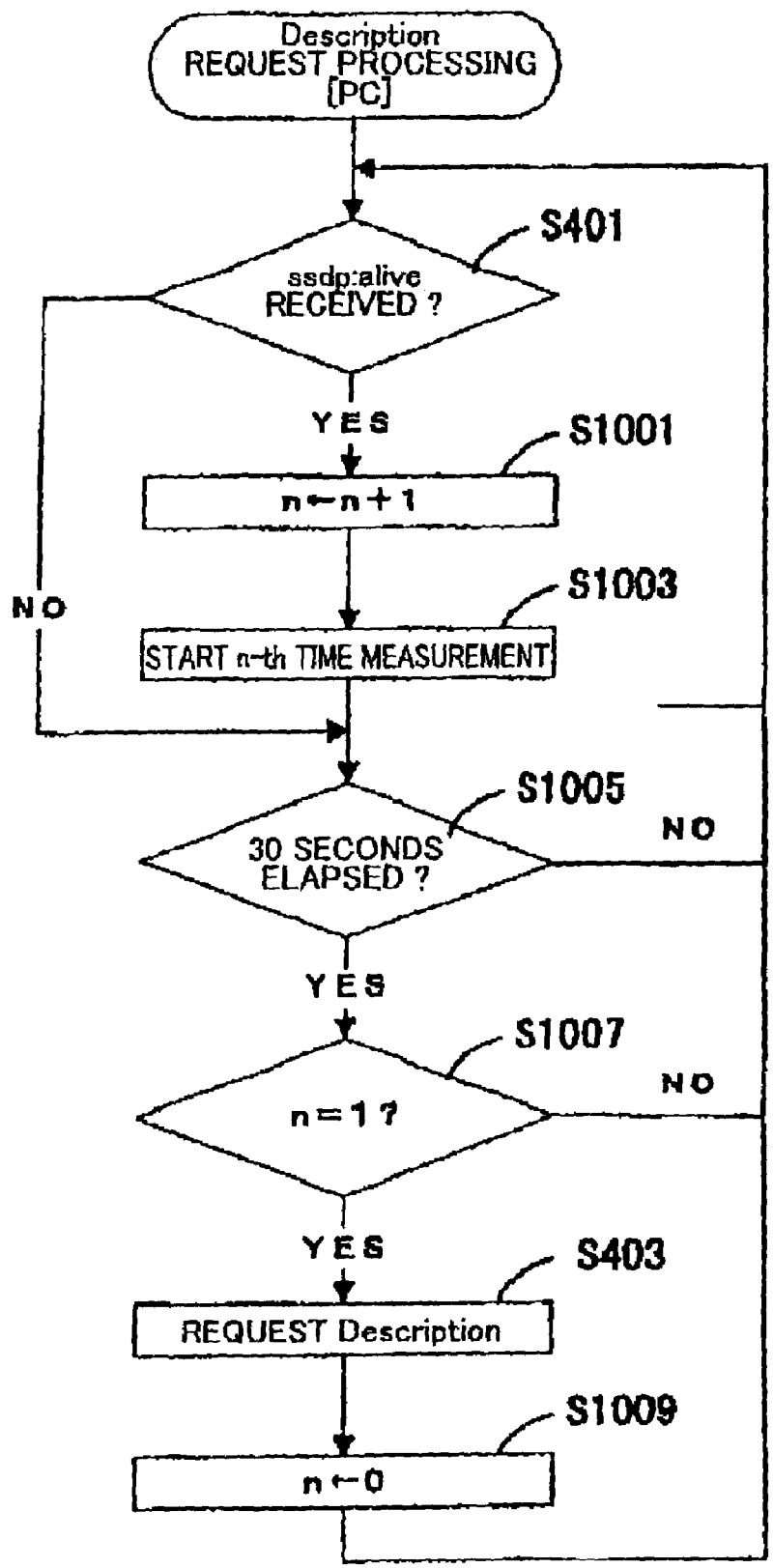
FIG. 11 is a flowchart showing Description request processing according to the third embodiment.

FIG. 11 shows the Description request processing executed by a PC 2, that is, the operation of a PC 2 when the CPU 21 executes a description request program stored in the HDD 24 of the PC 2.

The Description request processing shown in FIG. 11 differs from the Description request processing shown in FIG. 5 in the first embodiment in that processing steps S1001 through S1009 are newly added.

When the Description request processing of FIG. 11 is started, counter n is initialized to 0 and it is first judged in S401 whether or not ssdp:alive sent in S319 during the above-described printer 3 notification processing (FIG. 10) has been received. If it is determined that ssdp:alive has not been received (S401: NO), the processing flow proceeds to S1005.

If, on the other hand, it is determined that ssdp:alive has been received (S401: YES), the processing flow proceeds to S1001. In S1001, processing is performed to increment the value of the counter n by 1, and time measurement by the PC 2 timer 27 is started (S1003). It is noted that counter value n is linked to the respective time measurement processing that is started each time S1003 is executed (here referred to as "n-th time measurement" for convenience). Then, if it is determined in S401 that ssdp:alive has not been received (S401: NO), or after n-th time measurement has been started in S1003, it is determined whether or not 30 seconds have elapsed since time measurement was started (S1005). If it is determined in S1005 that 30 seconds have not yet elapsed or if time measurement has not actually been started (S10015 NO), the processing flow returns to S401.

If, on the other hand, it is determined in S1003 that 30 seconds have elapsed (S1005: YES), it is judged whether or not that elapse is according to the first time measurement—that is, whether or not 30 seconds have elapsed according to the time measurement started when the value of counter value n is 1 (S1007). If it is determined in S1007 that the elapse is not according to the first count (S1007: NO), the processing flow returns to S401.

If, on the other hand, it is determined in S1007 that the elapse is according to the first count (S1007: YES), the processing flow proceeds to S403. In S403, based on the reception of ssdp:alive from the printer 3, processing is performed to issue a request to the printer 3 that has sent ssdp:alive transmission of a Description containing setting information of the subject printer 3. After S403 processing has been performed, processing is performed in S1009 to input zero (0) to counter value n, and the processing flow returns again to S401.

In this way, when ssdp:alive is first received after a Description transmission request is made in S403 (S403, S1009, S401; YES), counter value n becomes 1 in S1001, and the first time measurement is started (5003). Then, a Description transmission request is made (S403) only when a 30-second interval has been measured by the first time measurement (S1005: YES, S1007: YES). In other words, second time measurement or third time measurement is performed only if ssdp:alive is received during execution of the first time measurement (S401: YES), but in the case of such second time measurement or third time measurement, control is performed so that a Description transmission request is not made (S1007: NO) even if 30 seconds elapse (S1005: YES).

It is noted that according to the present embodiment, the printer 3 executes the response process of FIG. 6 in the same manner as in the first embodiment.

Sample operations when the processing steps in the third embodiment are actually carried out will be described here while referring to the flowcharts shown in FIG. 6, FIG. 10, and FIG. 11, and the timing chart shown in FIG. 12. In describing sample operations according to the third embodiment, the same example will be taken as in the first embodiment—that is, an example in which a user consecutively changes the default settings for printer 3 print quality, paper size, and multiple page printing, at 10-second intervals.

First, when the default setting for printer 3 print quality is changed by a user, such as a change from low quality to medium quality, for example, (corresponding to S301: YES in FIG. 10, T601 in FIG. 12), information in the setting information table 34a provided in the NVRAM 34 is updated (corresponding to S303 in FIG. 10), and then ssdp:byebye is sent to the PCs 2 (corresponding to S305 in FIG. 10, T1101 in FIG. 12). Then a printer reset operation (corresponding to S315 in FIG. 10, T1103 in FIG. 12) and Description initialization/generation operation (corresponding to S317 in FIG. 10, T1105 in FIG. 12) are executed, and ssdp:alive is sent to the PCs 2 (corresponding to S319 in FIG. 10, T1107 in FIG. 12). When the PC 2 receives this ssdp:alive (corresponding to S401: YES in FIG. 10), first time measurement is started (corresponding to S1003 in FIG. 11, T1109 in FIG. 12). In this example, a change in the paper size default setting (corresponding to S301: YES in FIG. 10, T607 in FIG. 12) and a change in the multiple page printing (condensed printing) default setting (corresponding to S301: YES in FIG. 10, T609 in FIG. 12) are made before the elapse of 30 seconds from the start of the first time measurement by the timer 27. Accordingly, in the same way as for the print quality default setting change, at the timing for each setting change, information in the setting information table 34a is updated (corresponding to S303 in FIG. 10), ssdp:byebye is sent to the PCs 2 (corresponding to S305 in FIG. 10, T1111 and T1119 in FIG. 12), a printer reset operation is executed (corresponding to S315 in FIG. 10, T1113 and T1121 in FIG. 12), Description initialization/generation operation is executed (corresponding to S317 in FIG. 10, T1115 and T1123 in FIG. 12), and ssdp:alive is sent to the PCs 2 (corresponding to S319 in FIG. 10, T1117 and T1125 in FIG. 12).

When the PC 2 receives ssdp:alive based on a paper size default setting change and multiple page printing (condensed printing) default setting change (S401; YES in FIG. 11), since the first time measurement is presently being performed due to the ssdp:alive sent based on the print quality default setting change, time measurement is started as second time measurement and third time measurement, respectively (S1003). Then, when 30 seconds have elapsed since the first time measurement was started (corresponding to S1005: YES, S1007: YES in FIG. 11), a Description request is issued to the printer 3 by using an HTTP GET command (corresponding to S403 in FIG. 11, T1127 in FIG. 12), and the PC 2 acquires a Description sent from the printer 3 that has received this request (corresponding to S501; YES, S503: YES, and S505 in FIG. 6, and T1129 in FIG. 12).

Figure 12:
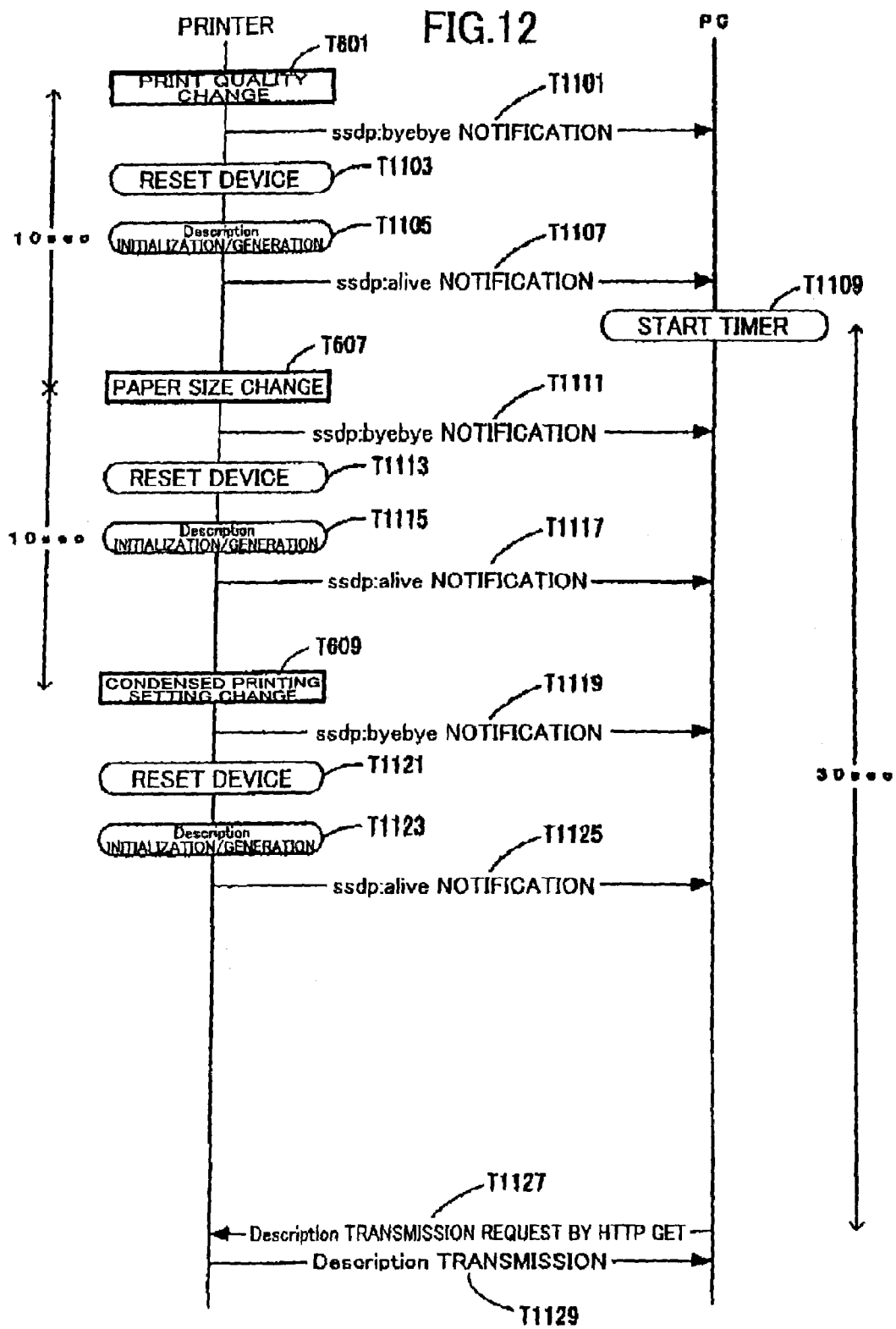
FIG. 12 is a timing chart showing printer-PC data transmission/reception timing according to the third embodiment.

As described above, according to the setting information transmission/reception system of the third embodiment, when a printer setting is changed by the PC operating section 25 or printer operating section 35, the printer 3 sends ssdp:alive to PCs 2 based on that change (corresponding to S319 in FIG. 10, T1107, T1117, T1125 in FIG. 12). Then the PC 2 determines whether or not notification has been received according to this ssdp:alive, and based on determination that notification has been received according to ssdp:alive (corresponding to S401: YES in FIG. 11, T1107 in FIG. 12), starts time measurement by the timer 27 (corresponding to S1003 in FIG. 11, T1109 in FIG. 12). Then, when a predetermined period has elapsed based on time measurement by the timer 27 (corresponding to S1005: YES, S1007: YES in FIG. 11), the PC 2 requests Description transmission by sending an HTTP GET command to the printer 3 (corresponding to S403 in FIG. 11, T1127 in FIG. 12). On receiving this HTTP GET command (corresponding to S501: YES, S503: YES in FIG. 6), the printer 3 performs Description transmission to the PC 2 (corresponding to S505 in FIG. 6, T1129 in FIG. 12), and the PC 2 receives this description via the network interface 28.

In the above-described third embodiment, it is determined whether or not a further notification has been received from a printer 3 (corresponding to S401, S1001, S1007 in FIG. 11) within the predetermined period (S1005: NO, S1007: NO in FIG. 11), and control is performed so that a Description transmission request is not issued to the printer 3 in response to that further notification (corresponding to S1007 in FIG. 11).

In this way, Description transmission requests to a printer 3 are partially omitted (a plurality of transmission requests are combined into one) in the case of further notifications received within the predetermined period after reception of a notification based on a printer setting change, and a Description transmission request is no longer issued to a printer 3 each time a notification is received from the printer 3. Also, through the omission of such Description transmission requests, Description transmissions from a printer 3 to a PC 2 performed on the basis of these transmission requests are also effectively curtailed. That is to say, by omitting some Description transmission requests in response to notifications relating to setting changes acknowledged within a short period, it is possible to reduce the load on the network 1.

As described above, according to the third embodiment, when a transmitter setting is changed, notification is sent to the PCs (receivers). In the PC (receiver), when it is determined that a notification has been received, time measurement is started. Then, when a predetermined period has elapsed based on time measurement, the PC (receiver) requests the printer (transmitter) to transmit setting information, and on receiving this request, the printer (transmitter) transmits setting information. If it is determined that a further notification has been received within the predetermined period, the PC (receiver) executes control so that a request for transmission of setting information is not sent to the printer (transmitter) in response to this further notification. In this way, the PC (receiver) does not send requests for transmission of setting information to the transmitter independently for a prior received notification and a further notification received within the predetermined period after reception of the prior notification, and thus the amount of data sending on the network can be decreased, and the load imposed on the network can assuredly be reduced.

In the above-described third embodiment, an example has been described in which the program relating to notification processing shown in FIG. 10 is stored in the NVRAM 34 of a printer 3, but this is not a limitation, and this program may also be stored in a storage medium such as a flexible disk, magneto-optical disk, CD-ROM, hard disk, ROM, or RAM. Similarly, in the above-described third embodiment, an example has been described in which the program relating to Description request processing shown in FIG. 11 is stored in the HDD 24 of a PC 2, but this is not a limitation, and this program may also be stored in a storage medium such as a flexible disk, magneto-optical disk, CD-ROM, hard disk, ROM, or RAM.

Fourth Embodiment

Next, a fourth embodiment of the present invention will be described while referring mainly to FIG. 13 and FIG. 14. The fourth embodiment described below differs from the third embodiment only in the Description request processing executed by a PC 2, and therefore the description will concentrate on this different part. In the following description, components and processing steps identical to those in the third embodiment are assigned the same reference numerals as in the third embodiment.

Figure 13:
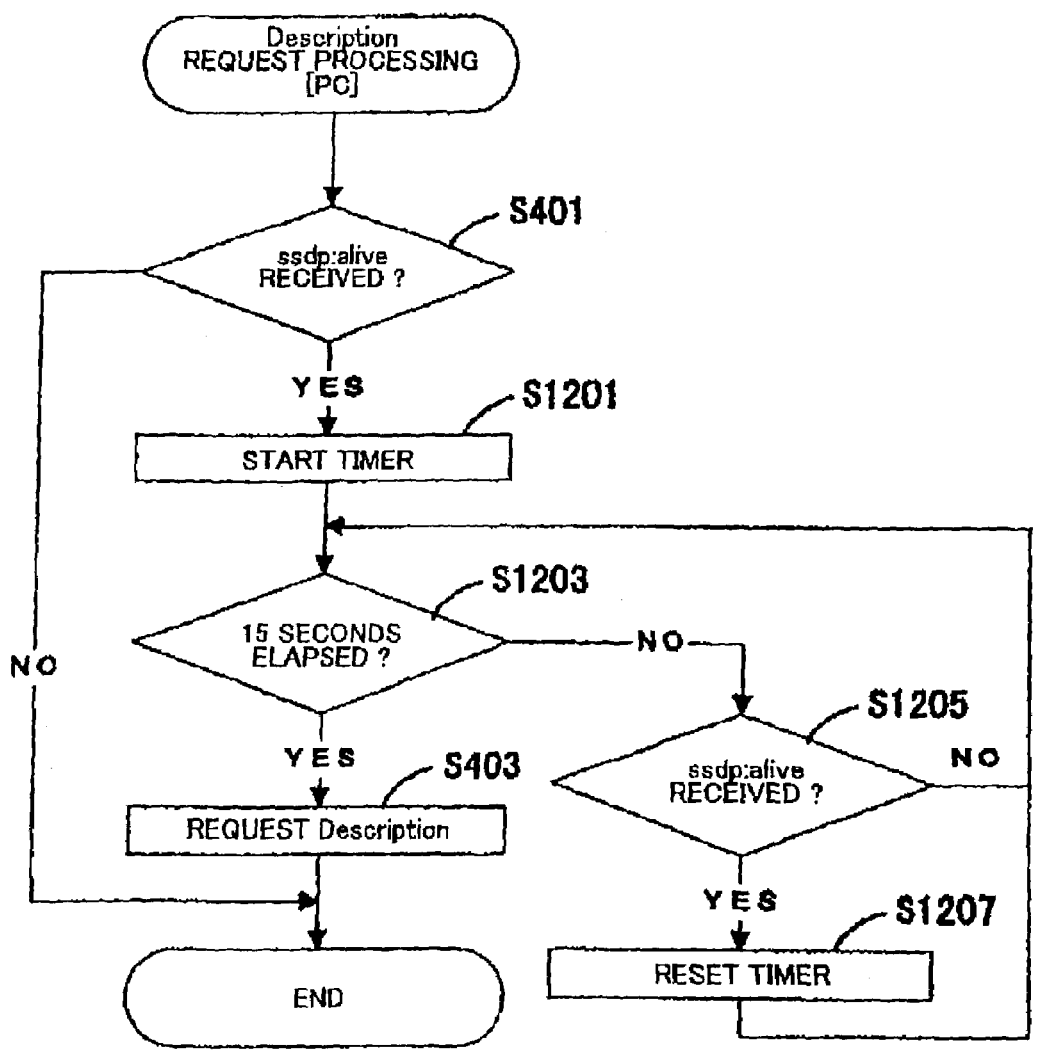
FIG. 13 is a flowchart showing Description request processing according to a fourth embodiment.

FIG. 13 shows the Description request processing executed by a PC 2, that is, the operation of a PC 2 when the CPU 21 executes a description request program stored in the HDD 24 of the PC 2.

The Description request processing shown in FIG. 13 differs from the Description request processing shown in FIG. 5 in the first embodiment in that processing steps S1201 through S1207 are newly added.

When the Description request processing shown in FIG. 13 is started, it is first judged whether or not ssdp:alive sent in S319 during the printer 3 notification processing according to the third embodiment (FIG. 10) has been received (S401). If it is determined that ssdp:alive has not been received (S401: NO), the Description request processing is terminated.

If, on the other hand, it is determined that ssdp:alive has been received (S401: YES), the processing flow proceeds to S1201. In S1201, time measurement by the timer 27 of the PC 2 is started. It is then judged whether or not fifteen seconds have elapsed since time measurement was started (S1203). If it is determined in S1203 that 15 seconds have not yet elapsed (S1203: NO), the processing flow proceeds to S1205.

If, on the other hand, it is determined in S1203 that 15 seconds have elapsed (S1203: YES), the processing flow proceeds to S403.

In S1205, it is judged whether or not a further ssdp:alive has been received before the elapse of 15 seconds from the start of time measurement by the timer 27 (S1201, S1203: NO). If it is determined in S1205 that a further ssdp:alive has not been received (S1205: NO), the processing flow returns directly to S1203.

If, on the other hand, it is determined in S1205 that a further ssdp:alive has been received (S1205: YES), time measurement by the timer 27 is reset (S1207), and then the processing flow returns to S1203. If it is determined in S1203 that 15 seconds have elapsed based on time measurement by the timer 27 (S1203: YES), processing is performed to issue a request to the printer 3 that has sent ssdp:alive for transmission of a Description containing setting information of the subject printer 3 (S403), and the Description request processing is terminated.

It is noted that according to the present embodiment, the printer 3 executes the notification process of FIG. 10 and the response process of FIG. 6.

Sample operations when the processing steps in the fourth embodiment are actually carried out will be described here while referring to the flowcharts shown in FIG. 6, FIG. 10, and FIG. 13, and the timing chart shown in FIG. 14. In describing sample operations according to the fourth embodiment, the same example will be taken as in the first embodiment—that is, an example in which a user consecutively changes the default settings for printer 3 print quality, paper size, and multiple page printing, at 10-second intervals.

First, when the default setting for printer 3 print quality is changed by a user, such as a change from low quality to medium quality, for example, (corresponding to S301: YES in FIG. 10, T601 in FIG. 14), information in the setting information table 34a provided in the NVRAM 34 is updated (corresponding to S303 in FIG. 10), and then ssdp:byebye is sent to the PCs 2 (corresponding to S305 in FIG. 10, T1101 in FIG. 14). Then a printer reset operation (corresponding to S315 in FIG. 10, T1103 in FIG. 14) and Description initialization/generation operation (corresponding to 6317 in FIG. 10, T1105 in FIG. 14) are executed, and ssdp:alive is sent to the PCs 2 (corresponding to S319 in FIG. 10, T1107 in FIG. 14). When the PC 2 receives this ssdp:alive (corresponding to S401: YES in FIG. 13), time measurement by the timer 27 is started (corresponding to S1201 in FIG. 13, T1109 in FIG. 14).

In this example, the paper size default setting is changed before the elapse of 15 seconds from the start of time measurement by the timer 27 (corresponding to S301: YES in FIG. 10, T607 in FIG. 14), and the multiple page printing (condensed printing) default setting is changed before the elapse of 15 seconds from the paper size default setting change (corresponding to S301: YES in FIG. 10, T609 in FIG. 14). Accordingly, in the same way as for the print quality default setting change, at the timing of each setting change, information in the setting information table 34a provided in the NVRAM 34 is updated (corresponding to S303 in FIG. 10), ssdp:byebye is sent to the PCs 2 (corresponding to S305 in FIG. 10, T1111 and T1119 in FIG. 14), a printer reset operation is executed (corresponding to S315 in FIG. 10, T1113 and T1121 in FIG. 14), Description initialization/generation operation is executed (corresponding to S317 in FIG. 10, T1115 and T1123 in FIG. 14), and ssdp:alive is sent to the PCs 2 (corresponding to S319 in FIG. 10, T1117 and T1125 in FIG. 14).

When the PC 2 receives ssdp:alive based on a paper size default setting change and multiple page printing (condensed printing) default setting change (S1205: YES in FIG. 13), time measurement by the timer 27 is reset (corresponding to S1207 in FIG. 13, T1301 and T1303 in FIG. 14). Then, when 15 seconds have elapsed since time measurement by the timer 27 was started (corresponding to S1203: YES in FIG. 13), a Description request is issued to the printer 3 according to an HTTP GET command (corresponding to S403 in FIG. 13, T1127 in FIG. 14), and the PC 2 acquires a Description sent from the printer 3 that has received this request (corresponding to S501: YES, S503: YES, and S505 in FIG. 6, and T1129 in FIG. 14).

As described above, according to the setting information transmission/reception system of the fourth embodiment, when a printer setting is changed by the PC operating section 25 or printer operating section 35, the printer 3 sends ssdp:alive to the PCs 2 based on that change (corresponding to S319 in FIG. 10, T1107, T1117, T1125 in FIG. 14). Then the PC 2 determines whether or not notification has been received according to this ssdp:alive, and based on determination that notification has been received by ssdp:alive (corresponding to S401: YES in FIG. 13, T1107 in FIG. 12), starts time measurement by the timer 27 (corresponding to S1201 in FIG. 13, T1109 in FIG. 14). The PC 2 also determines whether or not a further notification has been received from the printer (corresponding to S1205 in FIG. 13) within a predetermined period (S1203: NO in FIG. 13), and each time it is determined that a further notification has been received (corresponding to S1205: YES in FIG. 13, T1117 and T1125 in FIG. 14), resets the time measurement by the timer 27 and extends the period (corresponding to S1207 in FIG. 13, T1301 and T1303 in FIG. 14). Then, when the predetermined period has elapsed based on time measurement by the timer 27 (corresponding to S1203: YES in FIG. 13), the PC 2 requests Description transmission by sending an HTTP GET command to the printer 3 (corresponding to S403 in FIG. 13, T1127 in FIG. 14). On receiving this HTTP GET command (corresponding to S501: YES, S503: YES in FIG. 6), the printer 3 performs Description transmission to the PC 2 (corresponding to S505 in FIG. 6, T1129 in FIG. 12), and the PC 2 receives this description via the network interface 28.

In the above-described fourth embodiment, it is determined whether or not a further notification has been received from a printer 3 (corresponding to S1205 in FIG. 13) within a predetermined period (S1203: NO in FIG. 13), and control is performed so that a Description transmission request is not issued to the printer 3 in response to that further notification (corresponding to S1203, S403 in FIG. 13).

In this way, Description transmission requests to a printer 3 are partially omitted (a plurality of transmission requests are combined into one) in the case of further notifications received within a predetermined period after reception of a notification based on a printer setting change, and a Description transmission request is no longer issued to a printer 3 each time a notification is received from the printer 3. Also, through the omission of such Description transmission requests, Description transmissions from a printer 3 to a PC 2 performed on the basis of these transmission requests are also effectively curtailed. That is to say, by omitting some Description transmission requests in response to notifications relating to setting changes acknowledged within a short period, it is possible to reduce the load on the network 1.

As described above, according to the fourth embodiment, if it is determined that a further notification has been received within a predetermined period, the period is extended, and the period until a request increases. Accordingly, when a further notification is received within a predetermined period, the period is extended, thereby enabling the amount of data sending on the network to be further decreased.

In the above-described fourth embodiment, an example has been described in which the program relating to description request processing shown in FIG. 13 is stored in the HDD 24 of a PC 2, but this is not a limitation, and this program may also be stored in a storage medium such as a flexible disk, magneto-optical disk, CDROM, hard disk, ROM, or RAM. Also, in the above-described fourth embodiment, an example has been described in which, when a further notification is received within a predetermined period (51205: YES in FIG. 13), the predetermined period is extended by performing timer 27 reset processing ($1207 in Sig. 13), but this is not a limitation, and other processing may be used as long as it is processing that extends the predetermined period (such as processing that subtracts a predetermined amount of time from the time measurement result of the timer 27, for example).

Fifth Embodiment

Next, a fifth embodiment of the present invention will be described while referring to FIG. 15 to FIG. 20.

Fig 15 shows the operation of each PC 2 when its CPU 21 executes a management tool program stored in the HDD 24 of the PC 2. It is noted that this program may be stored in other storage media such as a flexible disk, magneto-optical disk, CD-ROM, hard disk, ROM, or RAM.

The user manipulates the operating section 25 on the PC 2 to change the settings of his/her desired printer 3 by executing the management tool program.

When the user manipulates the operating section 25 to input his/her desire to change settings of his/her desired printer 3, the management tool operation of FIG. 15 is started.

First, in S2001, the CPU 21 controls the display 26 to show a network setting page NP as shown in FIG. 16(A) based on a WEB page 34b supplied from the user's designated printer 3.

The network setting page NP has a network tab T1 on its upper portion, and includes therein: a Node Name window W1, an IP Address window W2, a Subnet Mask window W3, a Gateway window W4, an OK button B1, a Cancel button B2, and an Exit button B3. In the Node Name window W1, the user can set his/her desired name of the printer (node) 3. In the IP Address window W2, the user can set his/her desired IP address for the printer 3. In the Subnet Mask window W3, the user can set his/her desired subnet mask for the printer 3. In the Gateway window W4, the user can set his/her desired gateway for the printer 3. A printer tab T2 of a printing setting page PP, shown in FIG. 16(B), appears adjacent to the network tab T1.

Next, in S2003, the CPU 21. waits for any key input at the operating section 25 onto the network setting page NP (no in S2003). When some key input is detected (yes in S2003), the program proceeds to S2005, where the CPU 21. judges whether or not an OK button B1 is clicked.

If the OK button B1 is not clicked (no in S2005). the program proceeds to S2013,. where the CPU 21 judges whether or not a Cancel button B2 is clicked.

If the Cancel button B2 is not clicked (no in S2013), the program proceeds to S2017, where the CPU 21. judges whether or not the key input is for changing the node name in the Node Name window W1.

If the key input is not for changing the node name (no in S2017), the program proceeds to s2021, where the CPU 21 judges whether or not the key input is for changing the IP address in the IP Address window W2.

If the key input is not for changing the IP address (no in S2021), the program proceeds to S2025, where the CPU 21 judges whether or not the key input is for changing the subnet mask in the Subnet Mask window W3.

If the key input is not for changing the subnet mask (no in S2025), the program proceeds to S2029, where the CPU 21 judges whether or not the key input is for changing the gateway in the Gateway window W4.

If the key input is not for changing the gateway (no in s2029), the program proceeds to S2033, where the CPU 21 judges whether or not the printer tab T2 is clicked.

If the printer tab T2 is not clicked (no in S2033), the program proceeds to S2035, where the CPU 21 judges whether or not an Exit button B3 is clicked.

If the Exit button B3 is not clicked (no in S2035), the program returns to S2003. If the Exit button B3 is clicked (yes in S2035), the program ends.

On the other hand, if the OK button B1 is clicked (yes in S2005), the program proceeds to S2007, where the CPU 21 transmits to the printer 3 a start command for a group of setting changes.

Then, in S2009, the CPU 21 retrieves, one at a time, recordings of a plurality of setting changes which are now stored in the RAM 23. The CPU 21 transmits, one at a time, the retrieved recordings as a plurality of setting change commands to the printer 3.

Then, in S2011, the CPU 21 transmits to the printer 3 an end command for the group of setting changes. Then, the program returns to S2003.

On the other hand, if the Cancel button B2 is clicked (yes in S2013), the program proceeds to S2015, where the CPU 21 clears or deletes recordings of all the setting changes now stored in the RAM 23. Then, the program returns to S2003.

On the other hand, if the key input is for changing the node name (yes in S2017), the program proceeds to S2019, where the CPU 21 records changing of the node name in the RAM 23. Then, the program returns to S2003.

On the other hand, if the key input is for changing the IP address (yes in S2021), the program proceeds to S2023, where the CPU 21 records changing of the IP address in the RAM 23. Then, the program returns to S2003.

On the other hand, if the key input is for changing the subnet mask (yes in S2025), the program proceeds to S2027, where the CPU 21 records changing of the subnet mask in the RAM 23. Then, the program returns to S2003.

On the other hand, if the key input is for changing the gateway (yes in S2029), the program proceeds to S2031, where the CPU 21 records changing of the gateway in the RAM 23. Then, the program returns to S2003.

On the other hand, if the printer tab T2 is clicked (yes in S2033), the program proceeds to S2037, where the CPU 21 controls the display 26 to show the printing setting page PP as shown in FIG. 16(B).

The printing setting page PP has a printer tab T2 on its upper portion, and includes therein: an OK button B1', a Cancel button B2', an Exit button B3', a Resolution window W1', a Paper window W2', a Color/Mono window W3', and a Tray window W4'. The network tab T1 appears adjacent to the printer tab T2. In the Resolution window W1', the user can set his/her desired resolution, such as 600 dpi, with which the printer 3 is desired to execute printing. In the Paper window W2', the user can set, as a paper type, the image print size, with which the printer 3 is desired to print images onto a paper. In the Color/Mono window W3', the user can set a color type, such as a monochromatic or a full color, with which the printer 3 is desired to print. In the Tray window W4', the user can set his/her desired tray, such as a tray 1, from which the paper is desired to be picked up for printing.

Next, in S2039, the CPU 21 waits for any key input at the operating section 25 onto the printing setting page PP (no in S2039). When some key input is detected (yes in S2039), the program proceeds to S2041, where the CPU 21 judges whether or not an OK button B1' is clicked.

If the OK button B1' is not clicked (no in S2041), the program proceeds to S2049, where the CPU 21 judges whether or not a Cancel button B2' is clicked.

If the Cancel button B2' is not clicked (no in S2049), the program proceeds to S2053, where the CPU 21 judges whether or not the key input is for changing the resolution in the Resolution window W1'.

If the key input is not for changing the resolution (no in S2053), the program proceeds to S2057, where the CPU 21 judges whether or not the key input is for changing the paper (print image size) in the Paper window W2'.

If the key input is not for changing the paper (no in S2057), the program proceeds to S2061, where the CPU 21 judges whether or not the key input is for changing the color type in the Color/Mono window W3'.

If the key input is not for changing the color type (no in S2061), the program proceeds to S2065, where the CPU 21 judges whether or not the key input is for changing the tray in the Tray window W4'.

If the key input is not for changing the tray (no in S2065), the program proceeds to S2069, where the CPU 21 judges whether or not the network tab T1 is clicked.

If the network tab T1 is not clicked (no in S2069), the program proceeds to S2071, where the CPU 21 judges whether or not an Exit button B3' is clicked.

If the Exit button B3' is not clicked (no in S2071), the program returns to S2039. If the Exit button B3' is clicked (yes in S2071), the program ends.

On the other hand, if the OK button B1' is clicked (yes in S2041), the program proceeds to S2043, where the CPU 21 transmits to the printer 3 a start command for a group of setting changes.

Then, in S2045, the CPU 21 retrieves, one at a time, recordings of a plurality of setting changes which are now stored in the RAM 23. The CPU 21 transmits, one at a time, the retrieved recordings as a plurality of setting change commands to the printer 3.

Then, in S2047, the CPU 21 transmits to the printer 3 an end command for the group of setting changes. Then, the program returns to S2039.

On the other hand, if the Cancel button B2' is clicked (yes in S2049), the program proceeds to S2051, where the CPU 21 clears or deletes recordings of all the setting changes now stored in the RAM 23. Then, the program returns to S2039.

On the other hand, if the key input is for changing the resolution (yes in S2053), the program proceeds to S2055, where the CPU 21 records changing of the resolution in the RAM 23. Then, the program returns to S2039.

On the other hand, if the key input is for changing the paper (print image size) (yes in S2057), the program proceeds to S2059, where the CPU 21 records changing of the paper in the RAM 23. Then, the program returns to S2039.

On the other hand, if the key input is for changing the color type (yes in S2061), the program proceeds to S2063, where the CPU 21 records changing of the color type in the RAM 23. Then, the program returns to S2039.

On the other hand, if the key input is for changing the tray (yes in S2065), the program proceeds to S2067, where the CPU 21 records changing of the tray in the RAM 23. Then, the program returns to S2039.

On the other hand, if the network tab T1 is clicked (yes in S2069), the program returns to S2001.

Figure 17:
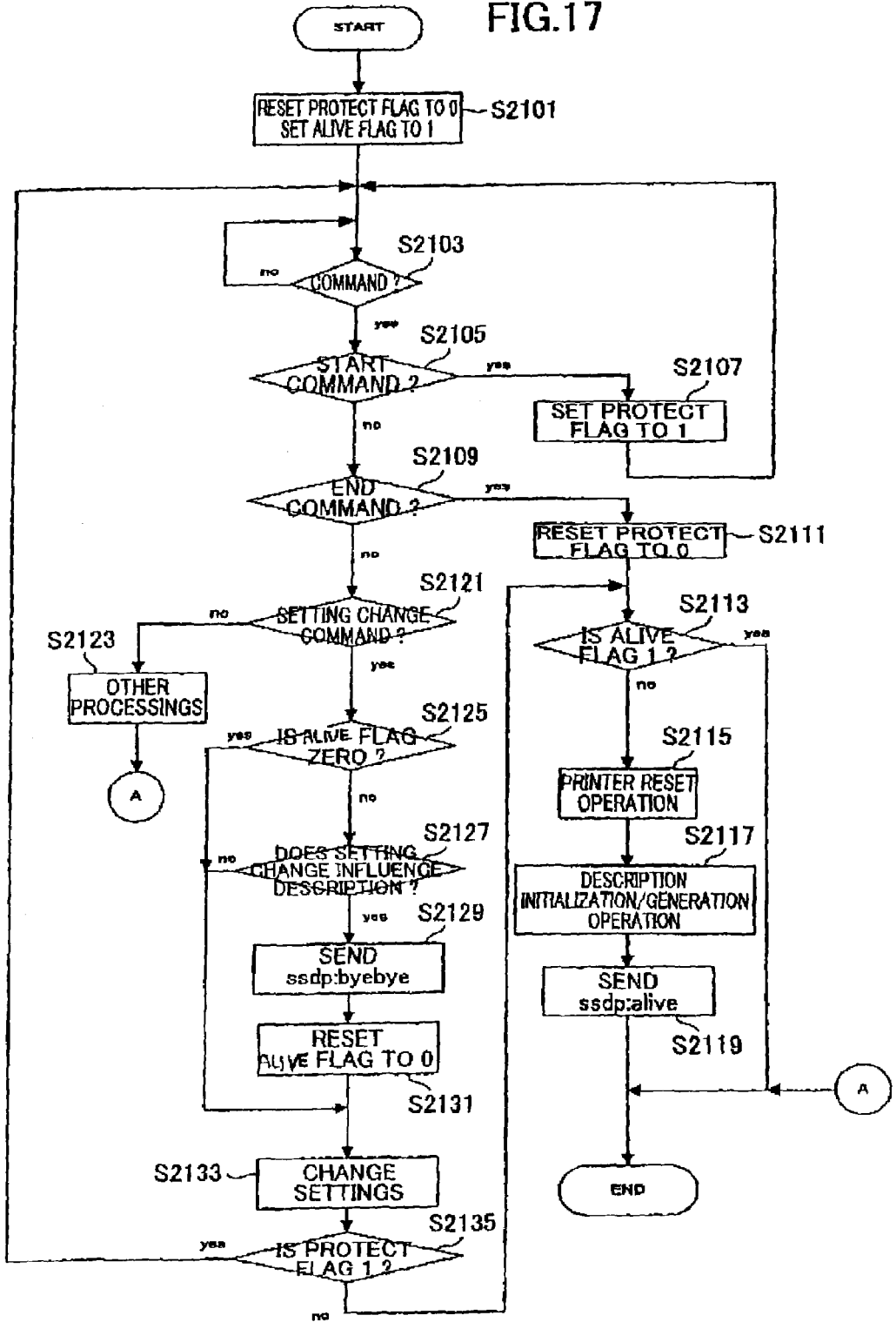
FIG. 17 is a flowchart showing notification processing according to the fifth embodiment.

According to the present embodiment, the printer 3 executes the notification processing as shown in FIG. 17. It is noted that the PC 2 executes the Description request process as shown in FIG. 5, and the printer 3 executes the response process as shown in FIG. 6.

FIG. 17 shows the operation of the printer 3 when its CPU 31 executes a notification program stored in the NVRAM 34 of the printer 3. It is noted that the notification program may be stored in other storage media such as a flexible disk, magneto-optical disk, CD-ROM, hard disk, ROM, or RAM.

The processes of FIG. 17 are executed at predetermined intervals.

When the processes are started, first, in S2101, the CPU 31 resets a protect flag to zero (0) and sets an alive flag to one (1).

Then, in S2103, the CPU 31 waits for arrival of some command (no in S2013). When the CPU 31 receives some command (yes in S2013), the program proceeds to S2105, where the CPU 31 judges whether or not the received command is the start command for a group of setting changes.

If the received command is not the start command for a group of setting changes (no in S2105), the program proceeds to S2109, where the CPU 31 judges whether or not the received command is the end command for a group of setting changes.

If the received command is not the end command for a group of setting changes (no in S2109), the program proceeds to S2121, where the CPU 31 judges whether or not the received command is a setting change command.

If the received command is not a setting change command (no in S2121), the program proceeds to S2123, where the CPU 31 executes other processings, and the program ends, On the other hand, if the received command is the start command for a group of setting changes (yes in S2105), the program proceeds to S2107, where the CPU 31 sets the protect flag to one (1). Then, the program returns to S2103.

On the other hand, if the received command is the end command for a group of setting changes (yes in S2109), the program proceeds to S2111, where the CPU 31 resets the protect flag to zero (0). Then, in S2113, the CPU 31 judges whether or not the alive flag is now one (1). If the alive flag is now one (1) (yes in S2113), the program ends.

On the other hand, if the alive flag is now zero (0) (no in S2113), the CPU 31 executes a printer 3 reset operation in S2115. Then, in S2117, the CPU 31 executes a Description initialization/generation operation. Then, in S2119, the CPU 31 broadcasts a ssdp:alive to the PCs 2. Then, the program ends.

On the other hand, if the received command is a setting change command (yes in S2121), the program proceeds to S2125, where the CPU 31 judges whether or not the alive flag is now zero (0) If the alive flag is now one (1) (no in S2125), the program proceeds to S2127, where the CPU 31 judges whether or not the setting change indicated by the setting change command will influence the contents of the Description.

Representative examples of the setting changes that will influence the contents of the Description include changes of settings for: IP address, Node name, information of location of the printer 3, the number of copies, orientation, paper size, paper type, print quality, and setting of both-sides sheet printing. Representative examples of the setting changes that will not influence the contents of the Description include changes of settings for: fonts, margins, TCP/IP time out, and DNS server address.

If the setting change indicated by the setting change command will influence the contents of the Description (yes in S2127), the program proceeds to S2129, where the CPU 31 broadcasts ssdp:byebye to the PCs 2. Then, in S2131, the CPU 31 resets the alive flag to zero (0). Then, in S2133, the CPU 31 changes the settings according to the setting change command. In other words, the CPU 31 updates the information in the setting information table 34a in the NVRAM 34.

Next, in S2135, the CPU 31 judges whether or not the protect flag is now one (1). If the protect flag is now one (1) (yes in S2135), the program returns to S2103. On the other hand, if the protect flag is now zero (0) (no in S2135), the program proceeds to S2113.

On the other hand, in S2125, if the alive flag is zero (0) (yes in S2125), the program proceeds directly to S2133.

If, in S2127, the setting change indicated by the setting change command will not influence the contents of the Description (no in S2127), the program also proceeds directly to S2133.

Figure 18:
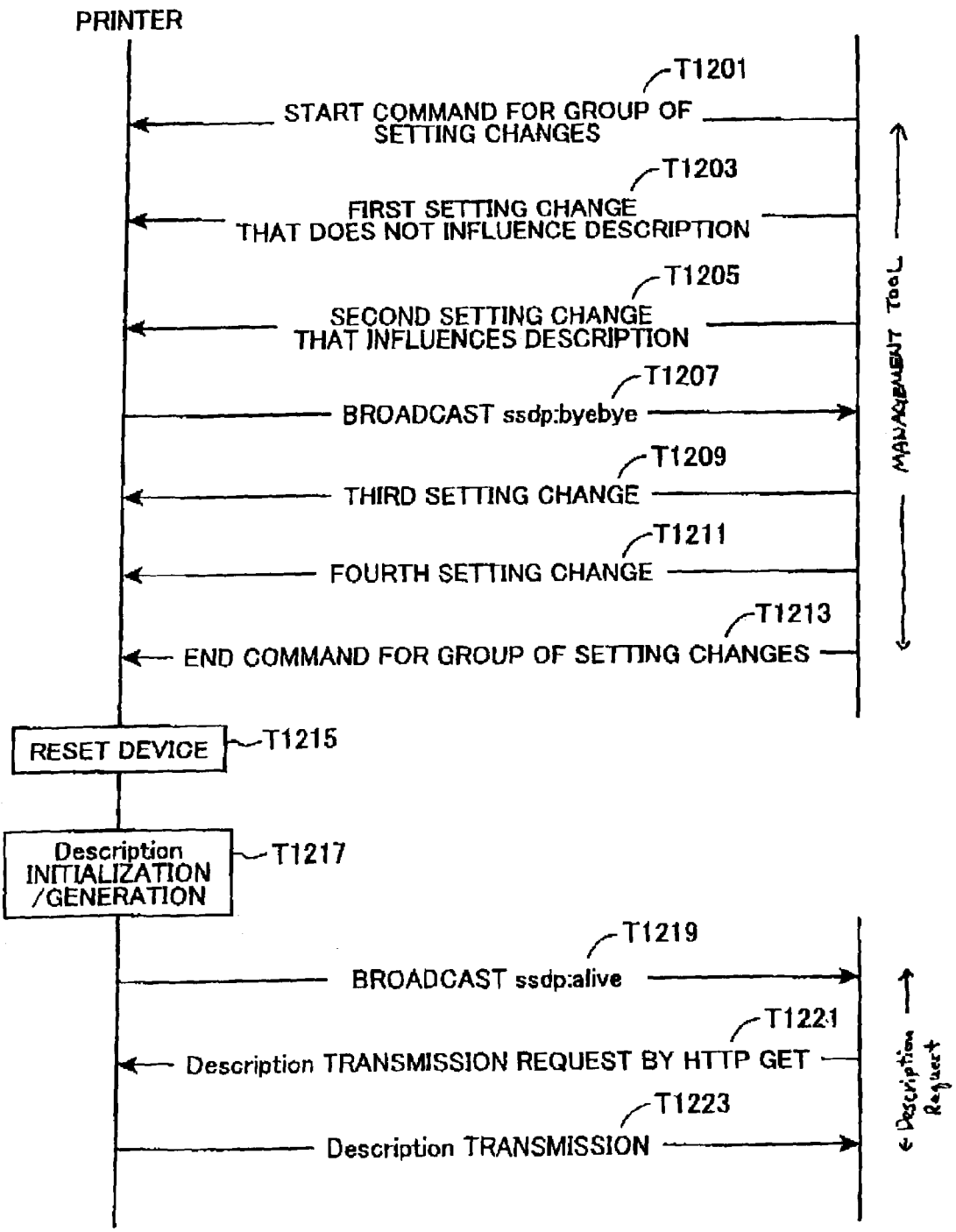
FIG. 18 is a timing chart showing printer-PC data transmission/reception timing according to the fifth embodiment.

Next, sample operations when the above-described processing steps in FIG. 5, FIG. 6, FIG. 15, and FIG. 17 are actually carried out will be described while referring to the timing chart shown in FIG. 18. In this example, a user manipulates the PC 2a as shown in FIG. 15 to designate, for the printer 3a, a first setting change that will not influence the Description, to next designate a second setting change that will influence the Description, to next designate a third setting change, and then to designate a fourth setting change, before finally clicking the OK button B1 or B1'.

In this example, the start command for the group of the first through fourth setting changes are first transmitted from the PC 2a to the printer 3a (T1201, corresponding to S2007 in FIG. 15 and "yes" in S2105 in FIG. 17). Then, the setting change command for the first setting change is transmitted from the PC 2a to the printer 3a (T1203, corresponding to S2009 in FIG. 15 and "yes" in S2121 and "no" in S2125 in FIG. 17). Because the first setting change does not influence the Description (no in S2127), the printer 3a does not transmit the ssdp:byebye to the PCs 2 at this time.

Then, the setting change command for the second setting change is transmitted from the PC 2a to the printer 3a (T1205, corresponding to S2009 in FIG. 15 and "yes" in S2121 and "no" in S2125 in FIG. 17). Because the second setting change influences the Description ("yes" in S2127), the printer 3a broadcasts ssdp:byebye to the PCs 2 at this time (T1207, corresponding to S2129).

Then, the setting change commands for the third and fourth setting changes are transmitted from the PC 2a to the printer 3a in this order (T1209 and T1211, corresponding to S2009 in FIG. 15 and "yes" in S2121 and in S2125).

Then, the end command for the group of the first through fourth setting changes is transmitted from the PC 2a to the printer 3a (T1213, corresponding to S2011 in FIG. 15 and "yes" in S2109 and "no" in S2113). In response to the end command for the group of the first through fourth setting changes, the printer 3 reset operation (T1215, corresponding to S2115 in FIG. 17) and Description initialization/generation operation (T1217, corresponding to S2117 in FIG. 17) are executed, and ssdp:alive is broadcasted to the PCs 2 (T1219, corresponding to S2119 in FIG. 17). When some PC 2 receives this ssdp:alive (corresponding to S401: YES in FIG. 5), the PC 2 sends a Description request to the printer 3a in the form of an HTTP GET command (T1221, corresponding to S403 in FIG. 4), and the PC 2 acquires a Description sent from the printer 3a (T1223, corresponding to S501: YES, S503: YES, and S505 in FIG. 6).

As described above, according to the present embodiment, when the user designates successive setting changes, the PC 2 first transmits a start command, then transmits commands for the successive setting changes, and finally transmits an end command. Upon receipt of these command, the printer 3 can recognize, as a group, the successive setting changes that are received between the start command and the end command. The printer 3 can send ssdp:alive to the PCs 2 only once after receiving the end command. It is unnecessary to execute time measurement.

<Modification>

The present embodiment can be modified so that the user manipulates the operating section 35 on the printer 3 to change the settings of the printer 3, such as the printer settings and the network settings.

Figure 19:
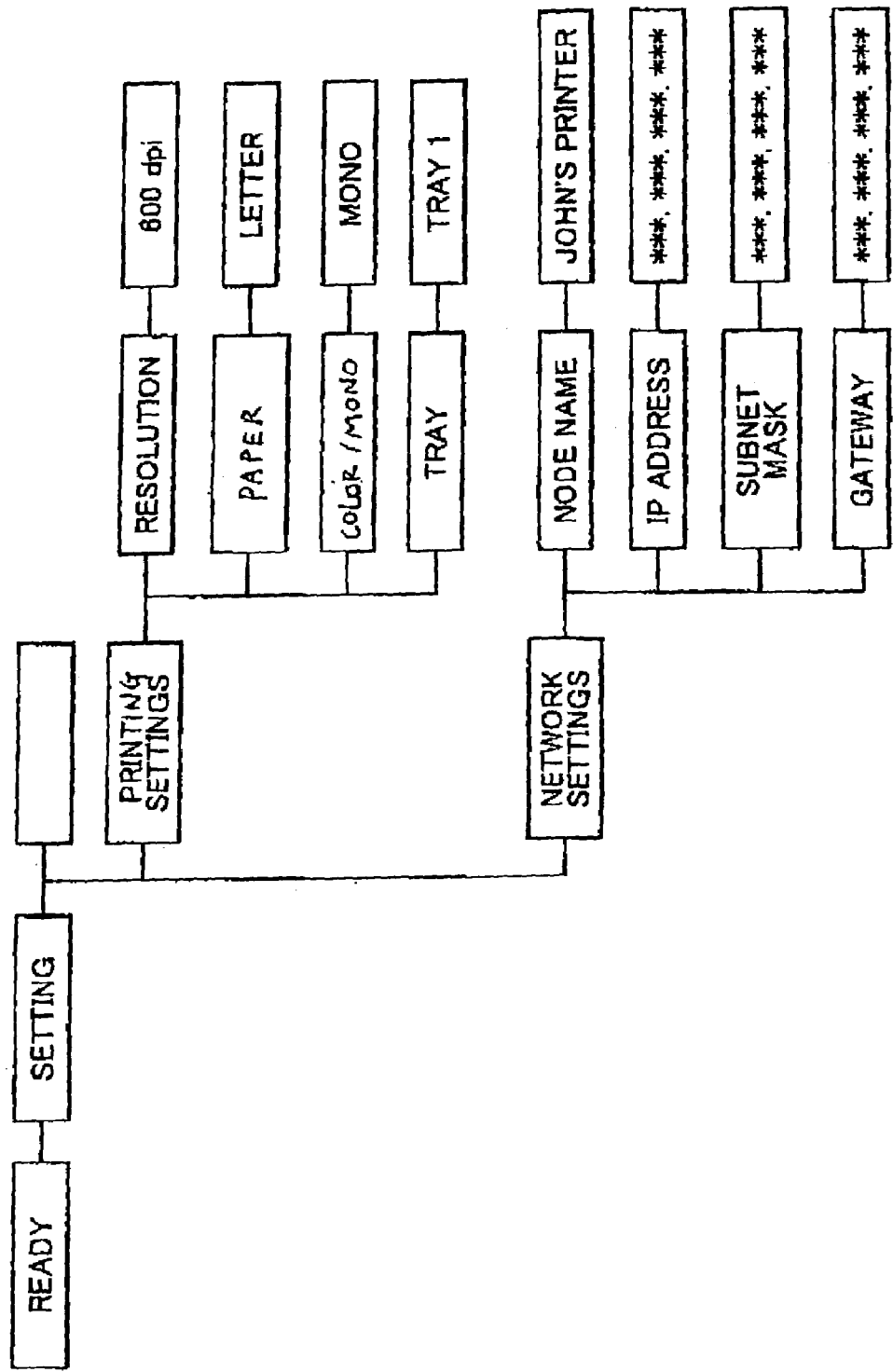
FIG. 19 shows a hierarchy structure of a key menu provided by an operating section of a printer.

An example of the key menu provided by the operating section 35 is of a hierarchy structure shown in FIG. 19. The key-menu includes the ready mode at its highest rank, and includes the setting mode and other modes (not shown) at its second highest rank. The key menu for the setting menu includes: "printing settings", "network settings", and the like. The key menu for "network settings" includes: a node name, an IP address, a subnet mask, a gate way, and the like. The key menu for "network settings" may further include DNS address. The key menu for "printing settings" includes: resolution, paper (print-image size), color/mono (color type), tray, and the like. The user can set his/her desired setting for each menu.

Figure 20:
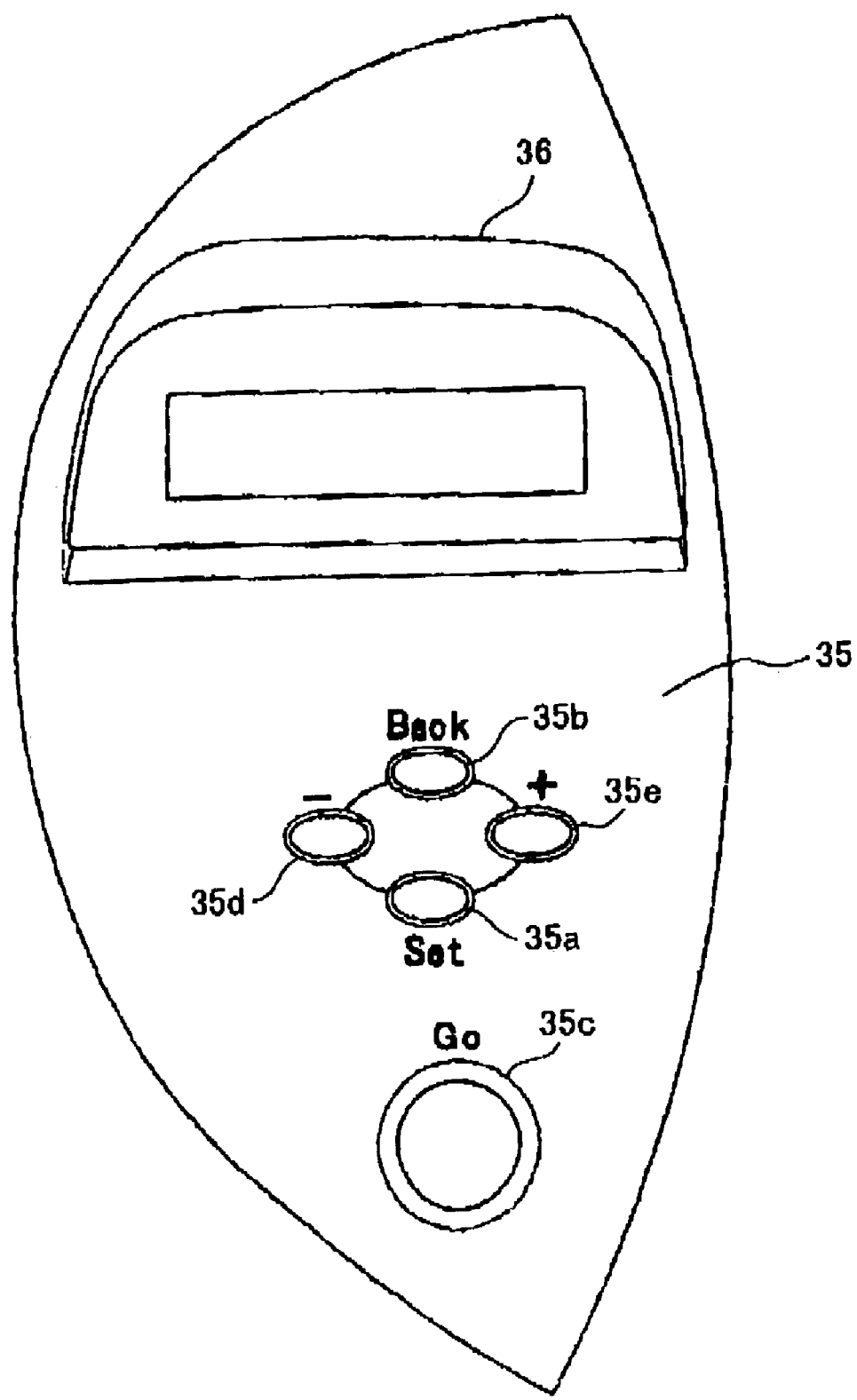
FIG. 20 shows the operating section of the printer.

As shown in FIG. 20, the operating section 35 includes: a set key 35a; a back key 35b, a go key 35c, a minus (−) key 35d, and a plus (+) key 35e at a location near to the display section 36. The minus (−) key 35d and the plus (+) key 35e are for changing a menu or a value presently being displayed on the display section 36. The set key 35a is for setting a menu or a value presently being displayed on the display section 36. By depressing the set key 35a for the first time, the printer 3 is brought from the ready mode (highest rank in the hierarchy structure of FIG. 19) into the setting mode (second highest rank) when the set key 35a is depressed after the minus (−) key 35d and/or the plus (+) key 35e is depressed during the setting mode, setting changing is finally set onto the presently-displayed value for the presently-displayed menu. The back key 35b is for returning the presently-displayed menu rank back to a rank immediately-higher than the present rank. The go key 35c is for exiting the hierarchy structure of FIG. 19 up to the highest rank, thereby bringing the printer 3 from the setting mode back to the ready mode.

According to this modification, the CPU 31 executes the notification processes of FIG. 17 in response to the user's manipulation of the operating section 35. More specifically, in S2103, the CPU 31 waits for any key input operation at the operating section 35. In S2105, the CPU 31 judges whether or not the set key 35a is depressed first after the CPU 31 has broadcasted ssdp:alive latest in S2119. The CPU 31 recognizes this depression of the set key 35a as a command for starting the setting mode. In S2109, the CPU 31 judges whether or not the go key 35c is depressed to indicate the end of the setting mode. In S2121, the CPU 31 judges whether or not the set key 35a is depressed after the minus and/or plus key 35d, 35e has been depressed after the setting mode has been started in S2105 (yes in S2105). The CPU 31 recognizes such a depression of the set key 35a after depression of the key 35d or 35e as a setting change command.

As described above, according to the present modification, when the user designates successive setting changes on the operating section 35, the printer 3 first recognizes a setting-mode start command, then recognizes commands for the successive setting changes, and finally recognizes a setting-mode end command. The printer 3 can therefore recognize, as a group, the successive setting changes that are designated between the setting-mode start command and the setting-mode end command. The printer 3 can send ssdp:alive to the PCs 2 only once after receiving the setting-mode end command. It becomes unnecessary to execute time measurement.

While the invention has been described in detail with reference to the specific embodiments thereof, it would be apparent to those skilled in the art that various changes and modifications may be made therein without departing from the spirit of the invention.

What is claimed is:

1. A transmitter connectable with a network, the transmitter comprising:
    a storage portion storing setting-information;
    an instruction receiving portion capable of receiving a setting-change instruction indicative of a setting-change;
    an instruction-group specifying portion specifying, as an instruction group, at least one successive setting-change instruction that includes instructions for a plurality of setting-changes, which is received by the instruction receiving portion successively and which is indicative of at least one setting-change;
    a setting-information updating portion successively updating the setting information in the storage portion based on the at least one successive setting-change in the instruction group, to thereby obtain final setting-information; and
    a transmission portion transmitting, via a network to a receiver, a set of final- setting-data indicative of the final setting-information only after the final setting-information is obtained without transmitting setting-information after each of the plurality of setting-changes,
    wherein the transmission portion includes:
        a final-setting-data creating portion creating the set of final-setting-data based on the final setting-information;
        a first notifying portion notifying the receiver when the final-setting-data creating portion creates the set of final-setting-data;
        a request receiving portion receiving a request from the receiver; and
        an upon-request transmitting portion transmitting, upon receipt of the request, the set of final-setting-data via the network to the receiver,
    the transmitter further comprising:
        an interface portion connectable to the network; and
        a second notifying portion notifying the receiver that the interface portion is disconnected from the network after the instruction-group specifying portion receives one setting-change instruction, whose corresponding setting-change will influence the set of final-setting-data to be created by the final-setting-data creating portion and which is received first after the first notifying portion executes notification,
    wherein the first notifying portion notifies, when the final-setting-data creating portion creates the set of final-setting-data, the receiver that the interface portion is brought back into connection with the network.

2. A transmitter as recited in claim 1, wherein the instruction-group specifying portion includes a command judging portion that judges whether or not the instruction receiving portion receives an end command, the instruction-group specifying portion specifying, as the instruction group, at least one setting-change instruction that the instruction receiving portion has received before receiving the end command.

3. A transmitter as recited in claim 2, wherein the command judging portion further judges whether or not the instruction receiving portion receives a start command, the instruction-group specifying portion specifying, as the instruction group, at least one setting-change instruction that the instruction receiving portion has received after receiving the start command and before receiving the end command.

4. A transmitter as recited in claim 1, wherein the instruction-group specifying portion specifies, as the instruction group, the at least one successive setting- change instruction received by the instruction receiving portion within a predetermined period of time.

5. A transmitter as recited in claim 1, wherein the instruction-group specifying portion specifies, as the instruction group, the at least one successive setting-change instruction received by the instruction receiving portion with a time interval between each two successive setting-change instructions in the at least one successive setting-change instruction being within a predetermined time interval.

6. A transmitter as recited in claim 4, wherein the instruction-group specifying portion includes a time measuring portion that starts measuring the predetermined period of time when the instruction receiving portion receives one setting-change instruction first when the time measuring portion performs no measurement, the instruction-group specifying portion specifying the subject setting-change instruction as a part of the group of setting-change instructions.

7. A transmitter as recited in claim 6, wherein when the instruction receiving portion receives another setting-change instruction within the predetermined period of time after start of the time measurement, the instruction-group specifying portion specifies the other setting-change instruction as another part of the group of setting-change instructions.

8. A transmitter as recited in claim 7, wherein the time measuring portion elongates the length of the predetermined period of time when the instruction receiving portion receives the other setting-change instruction within the predetermined period of time after start of the time measurement.

9. A transmitter as recited in claim 8, wherein the time measuring portion restarts measuring the predetermined period of time when the instruction receiving portion receives the other setting-change instruction within the predetermined period of time after start of the time measurement.

10. A transmitter as claimed in claim 1, wherein the instruction receiving portion includes an operation portion enabling a user to input his/her desired instruction.

11. A transmitter as claimed in claim 1, wherein the instruction receiving portion includes an input portion capable of receiving instruction from a remote device via the network.

* * * * *